Fig. 2

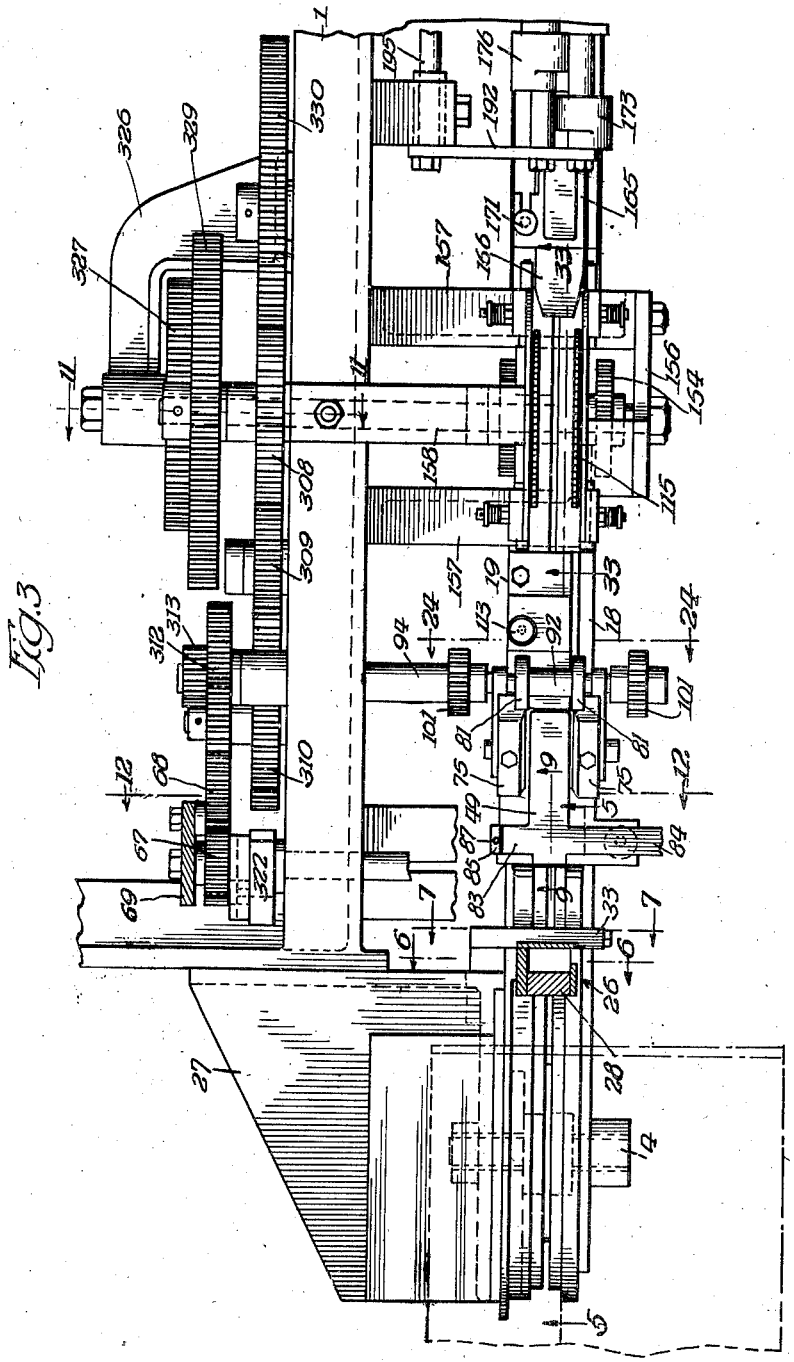

Aug. 26, 1947.
C. J. MALHIOT
2,426,314
WRAPPING MACHINE
Filed May 8, 1942
22 Sheets-Sheet 4
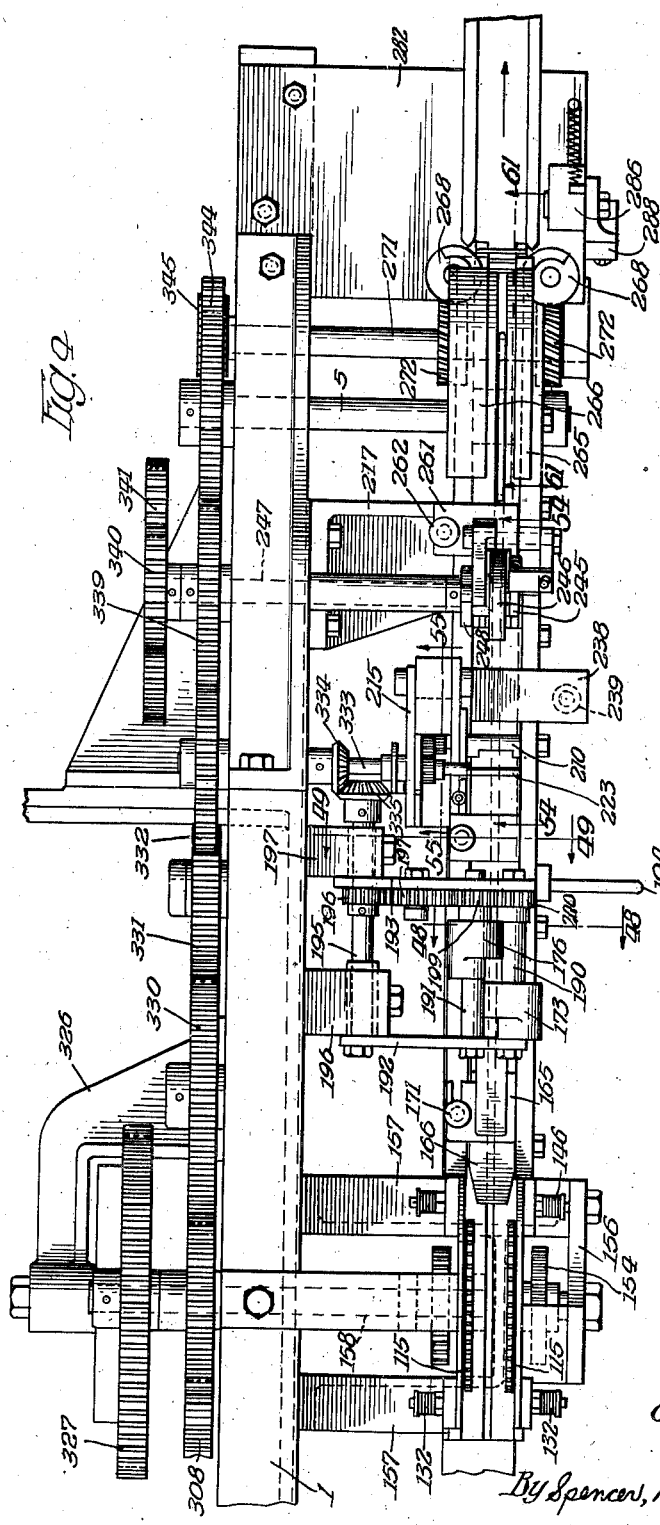
Inventor
Clarence J. Malhiot
By Spencer, Marzall, Johnston & Cook
Attys

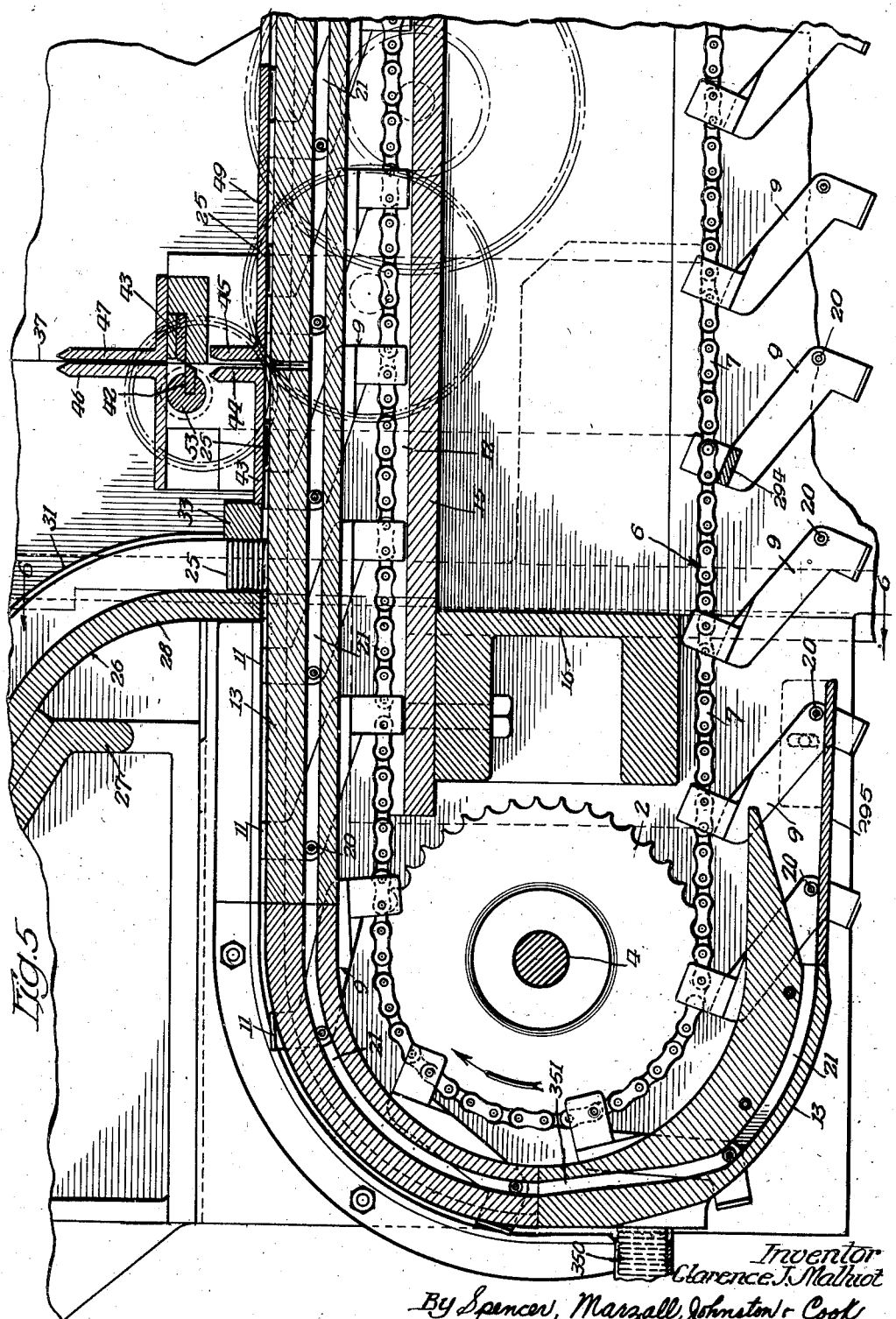

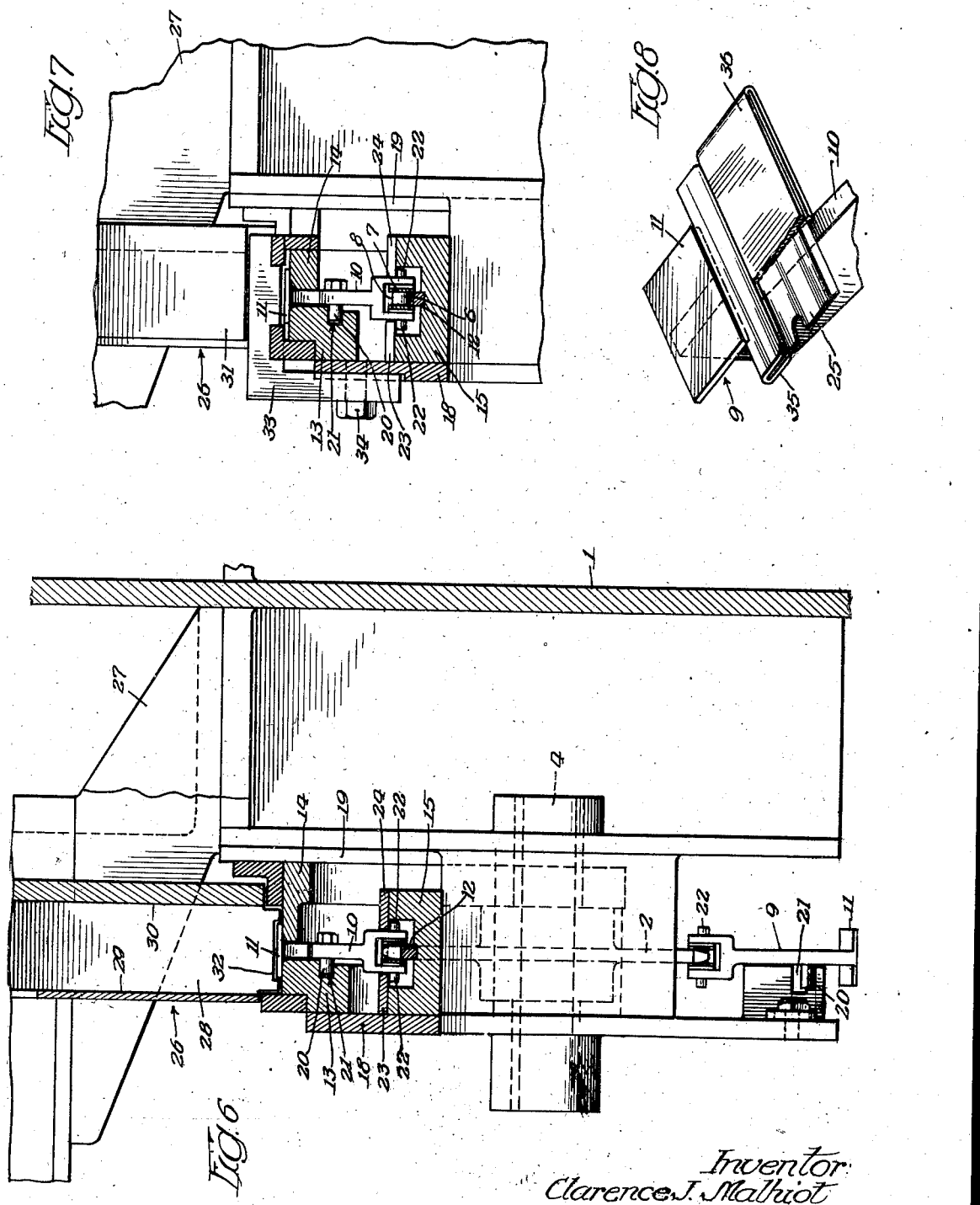

Aug. 26, 1947.  C. J. MALHIOT  2,426,314
WRAPPING MACHINE
Filed May 8, 1942  22 Sheets-Sheet 7
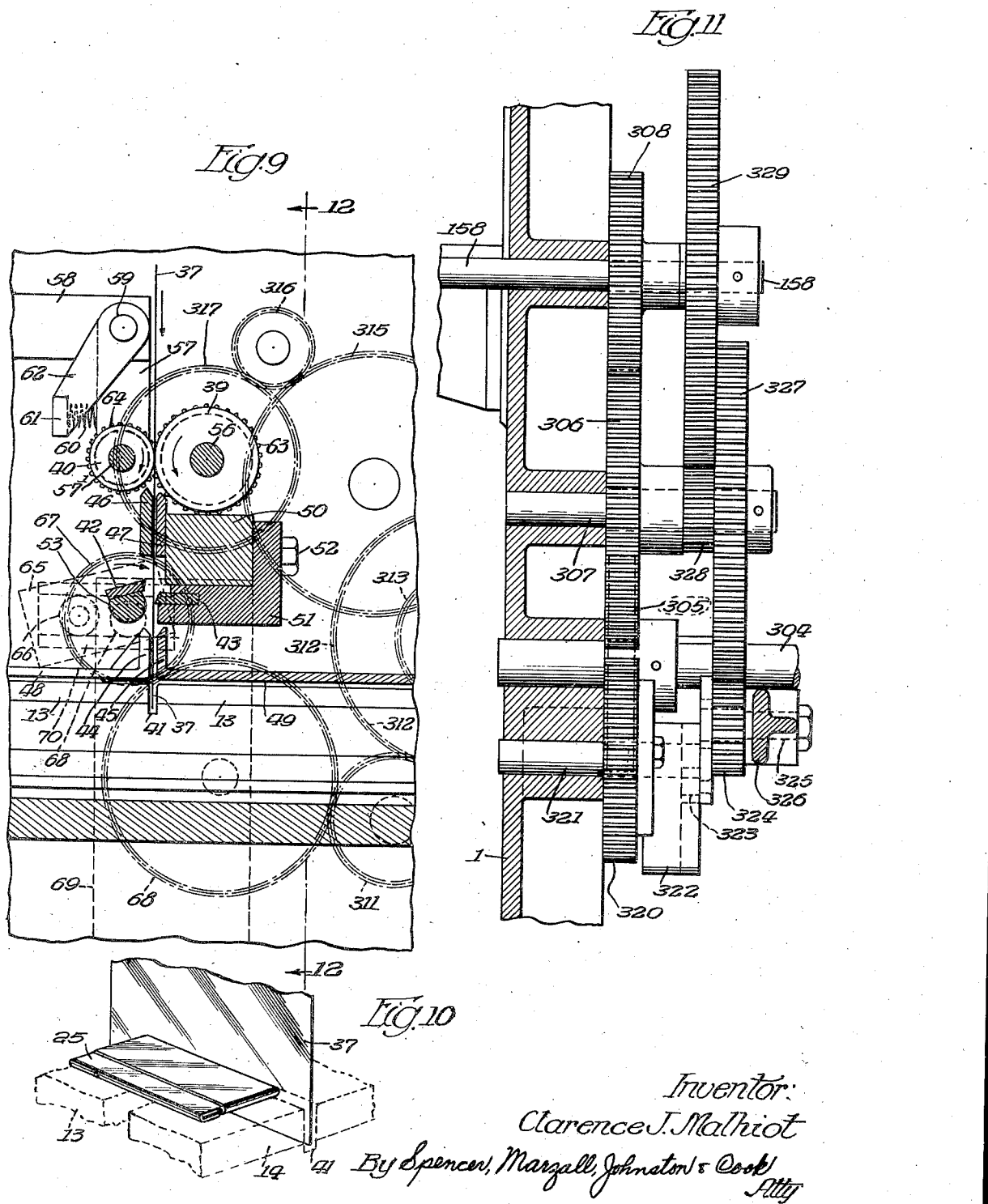
Inventor:
Clarence J. Malhiot
By Spencer, Marzall, Johnston & Cook
Atty

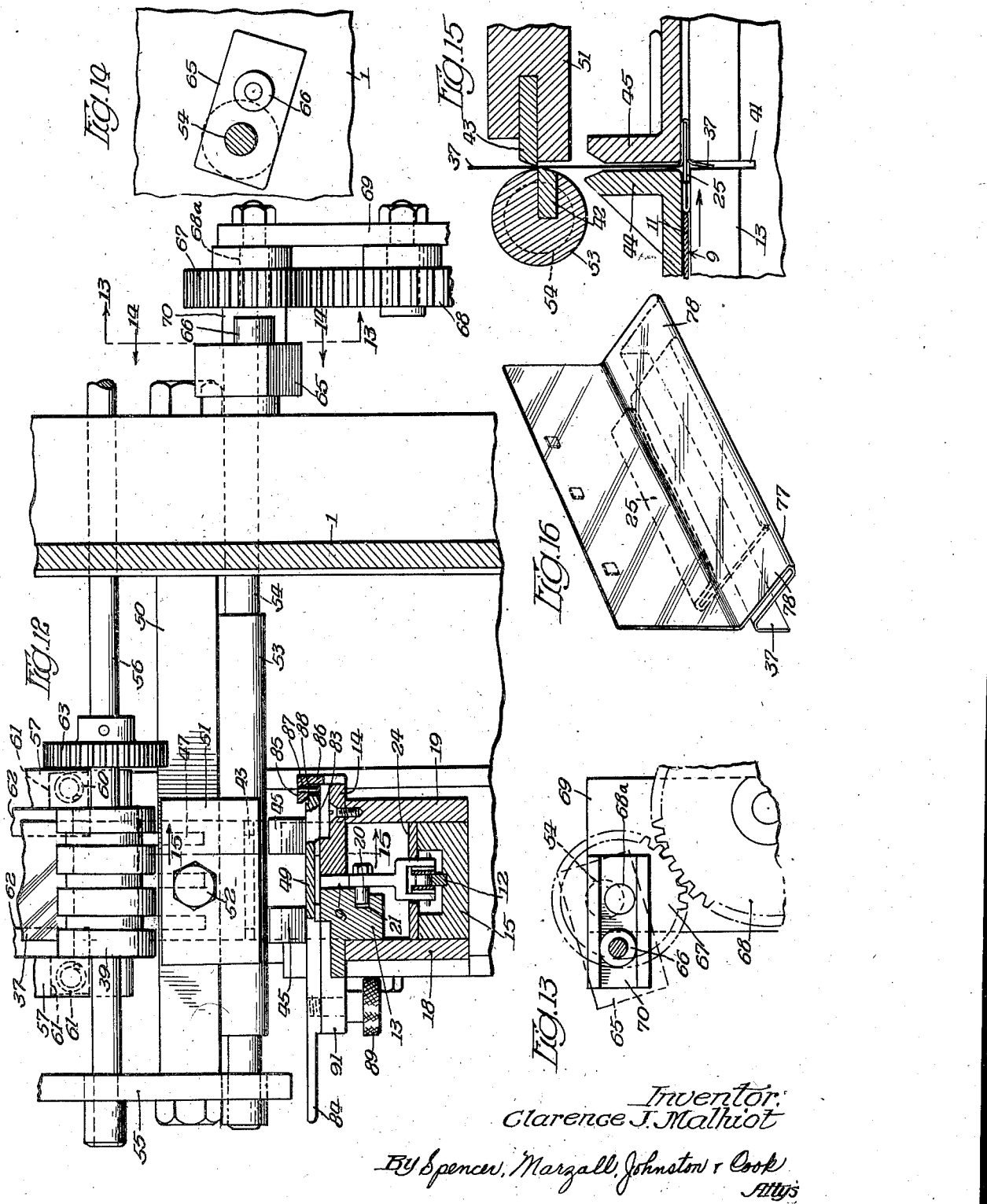

Aug. 26, 1947.    C. J. MALHIOT    2,426,314
WRAPPING MACHINE
Filed May 8, 1942    22 Sheets-Sheet 9

Inventor
Clarence J. Malhiot
By Spencer, Marzall, Johnston & Cook
Attys

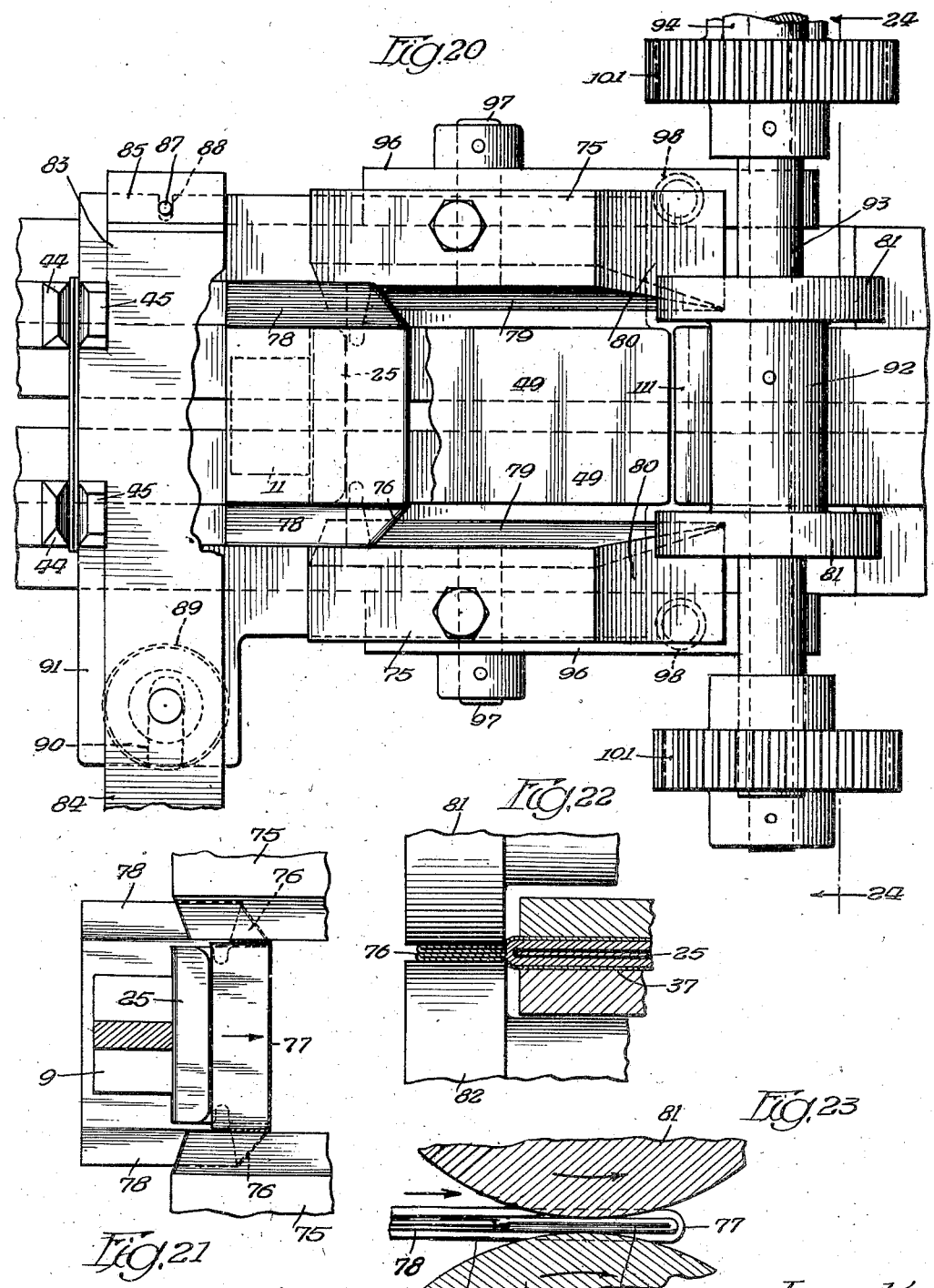

Aug. 26, 1947. C. J. MALHIOT 2,426,314
WRAPPING MACHINE
Filed May 8, 1942 22 Sheets-Sheet 11
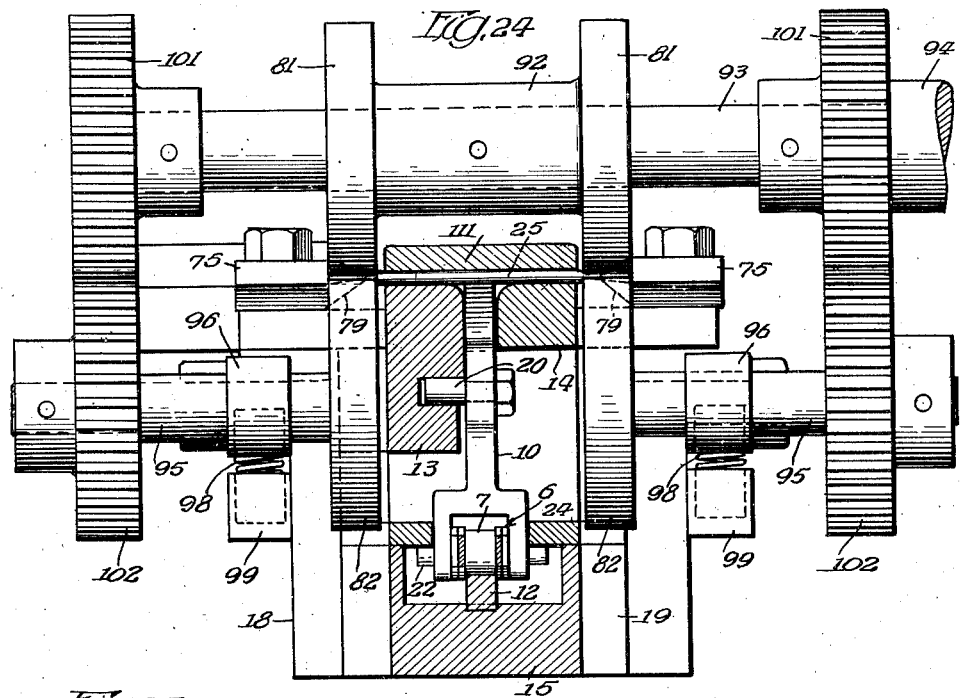
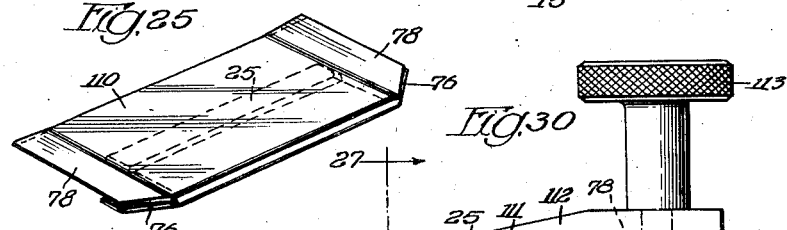
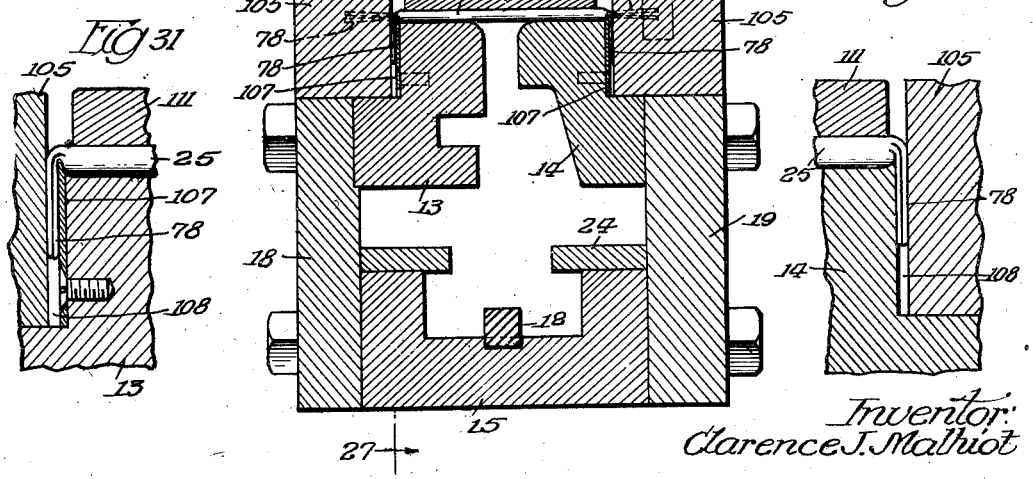
Inventor:
Clarence J. Malhiot
By Spencer, Marzall, Johnston & Cook
Attys.

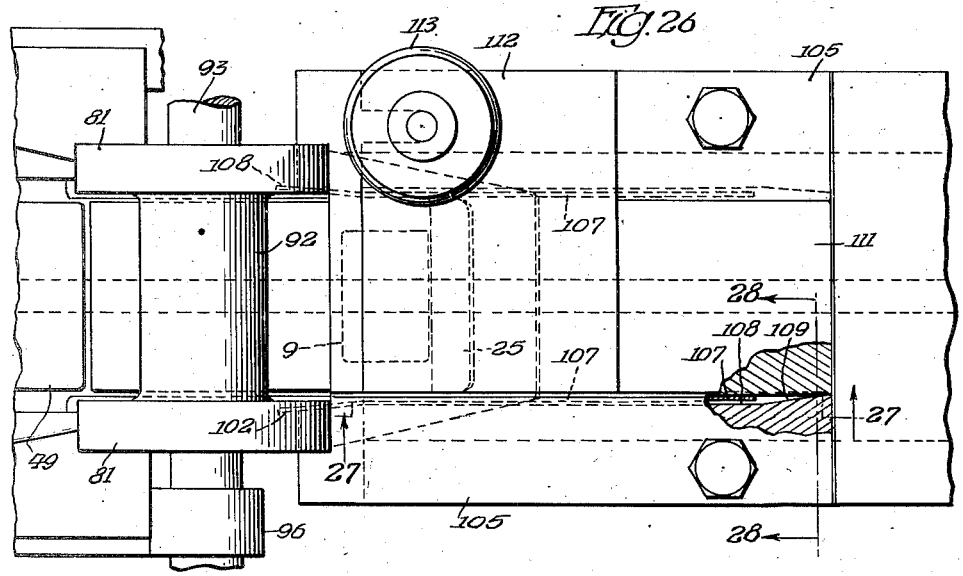
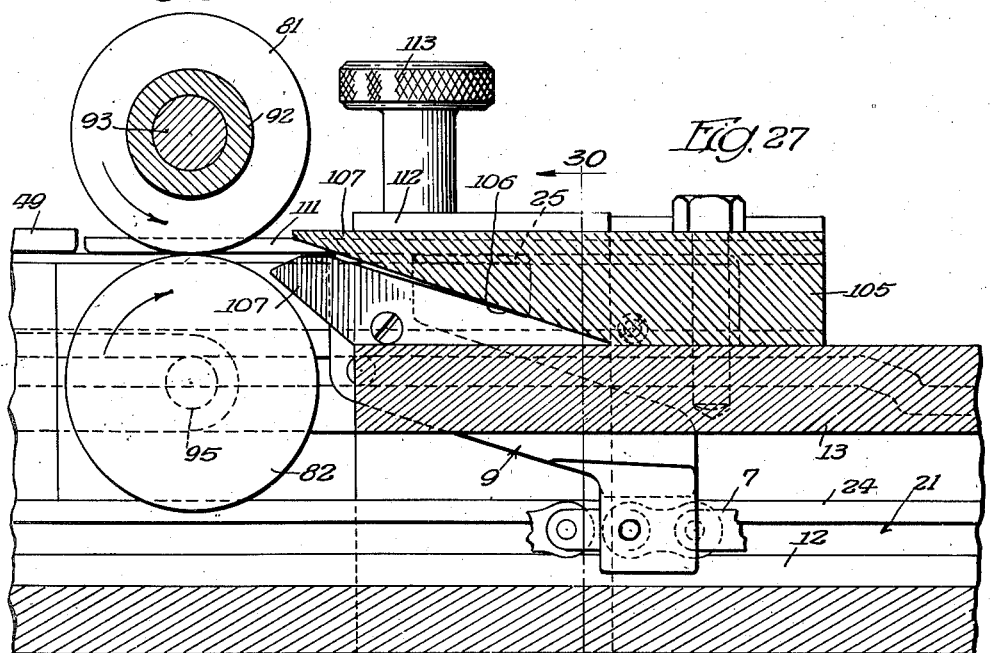
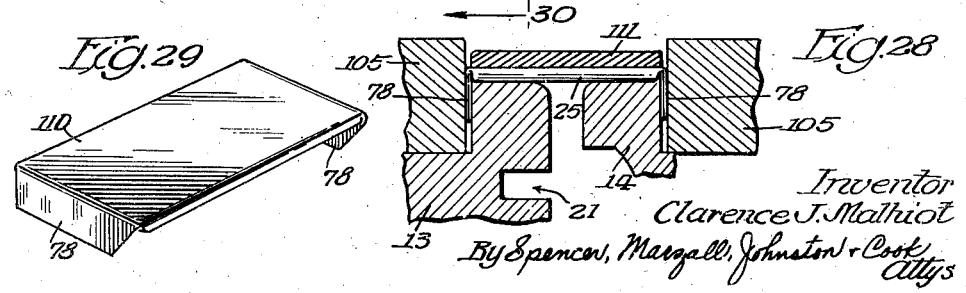

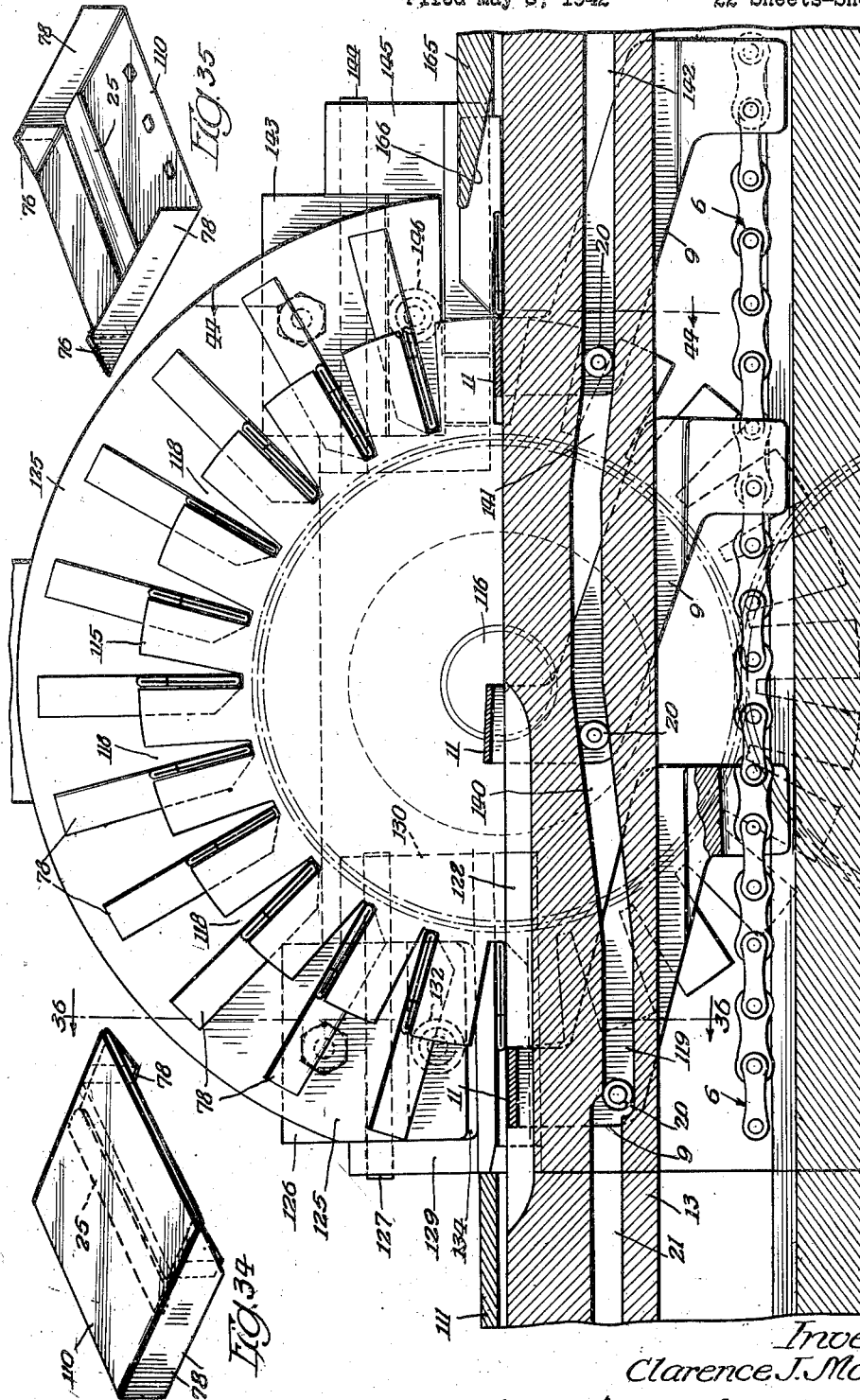

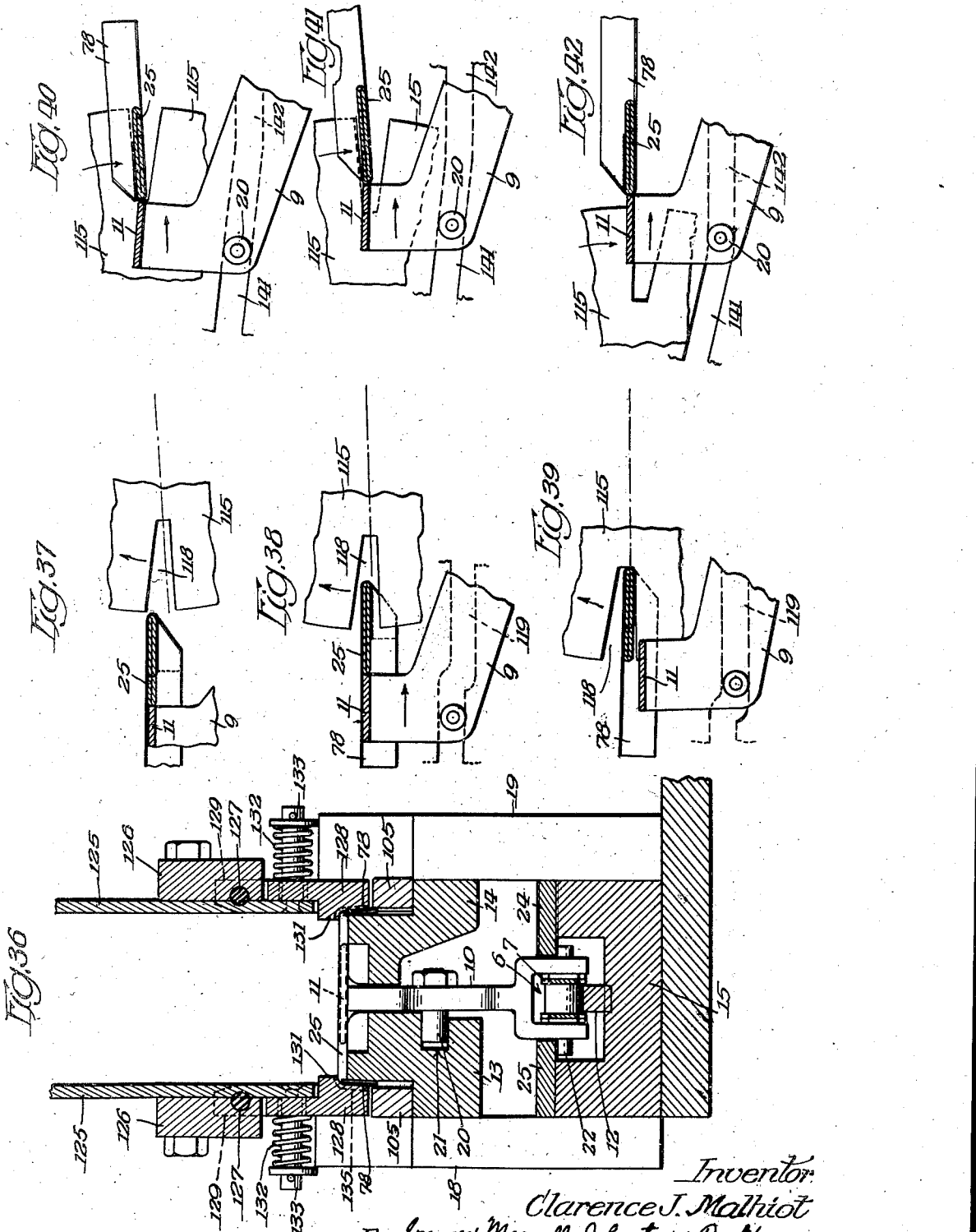

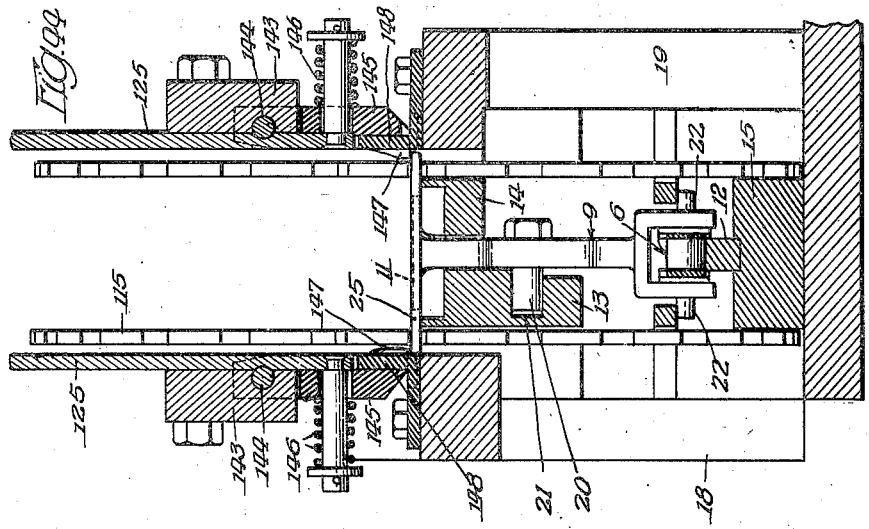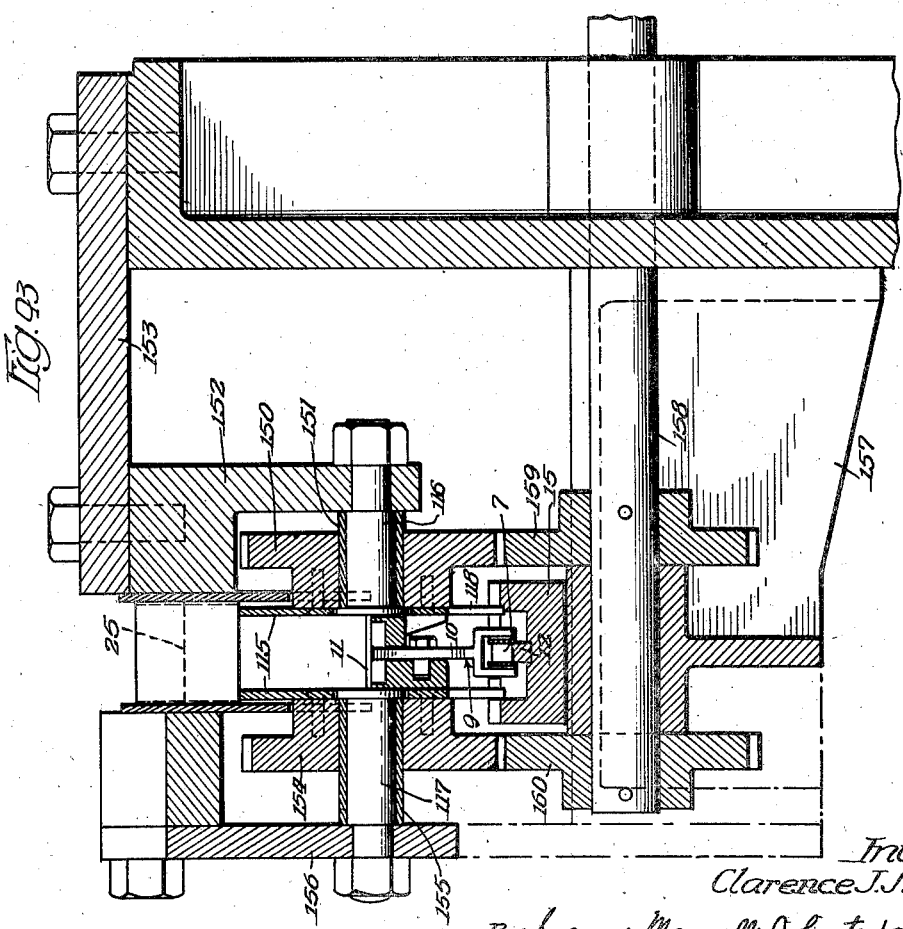

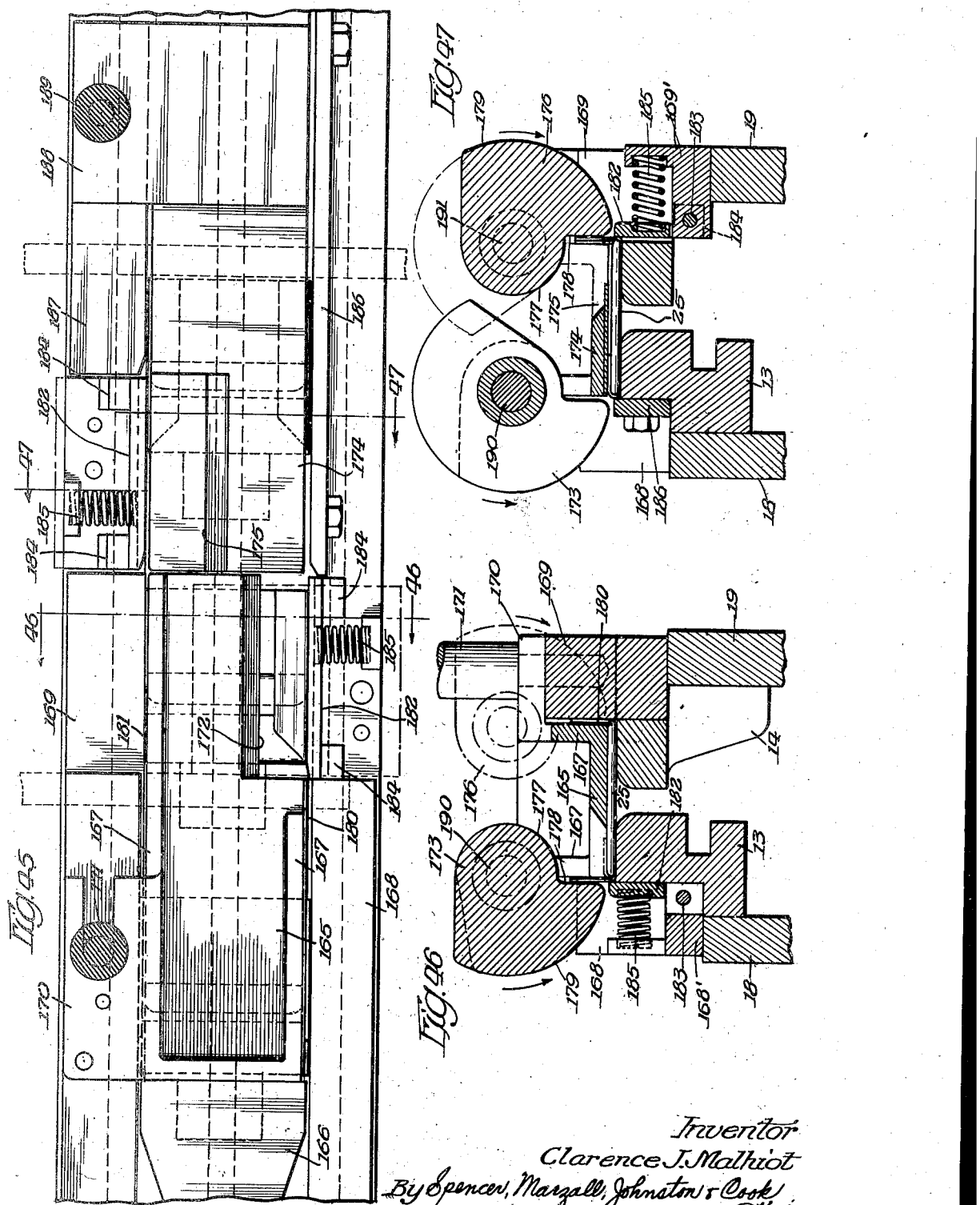

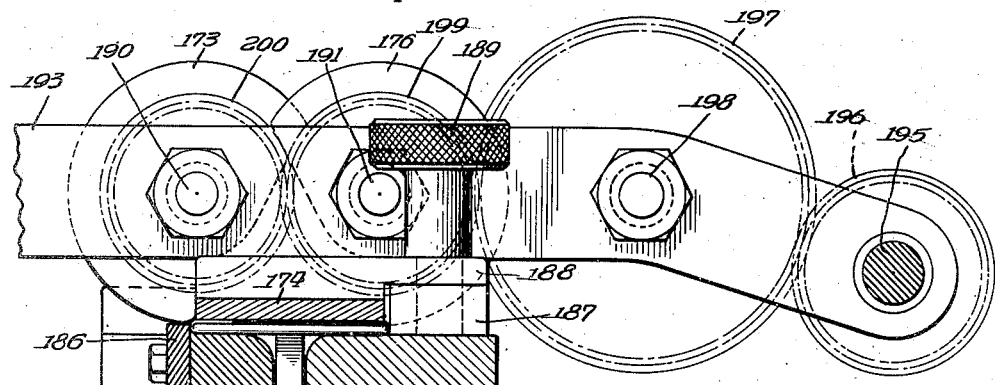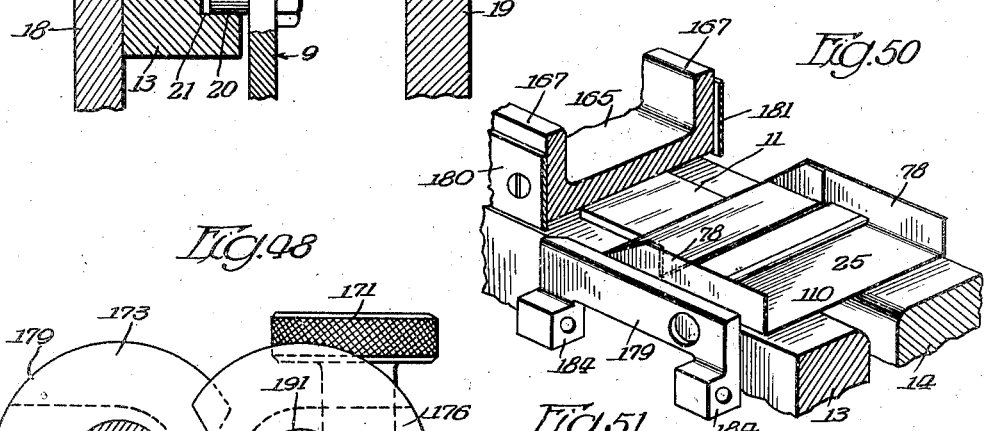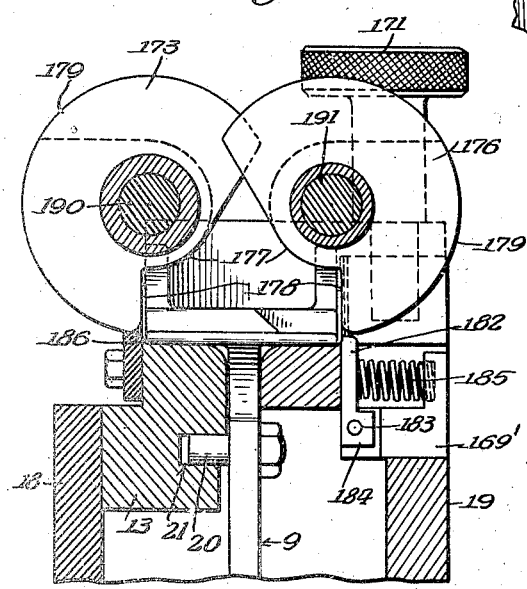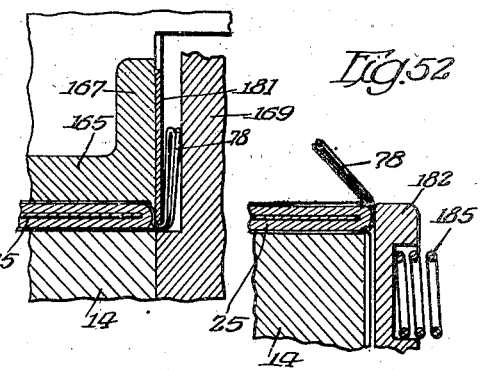

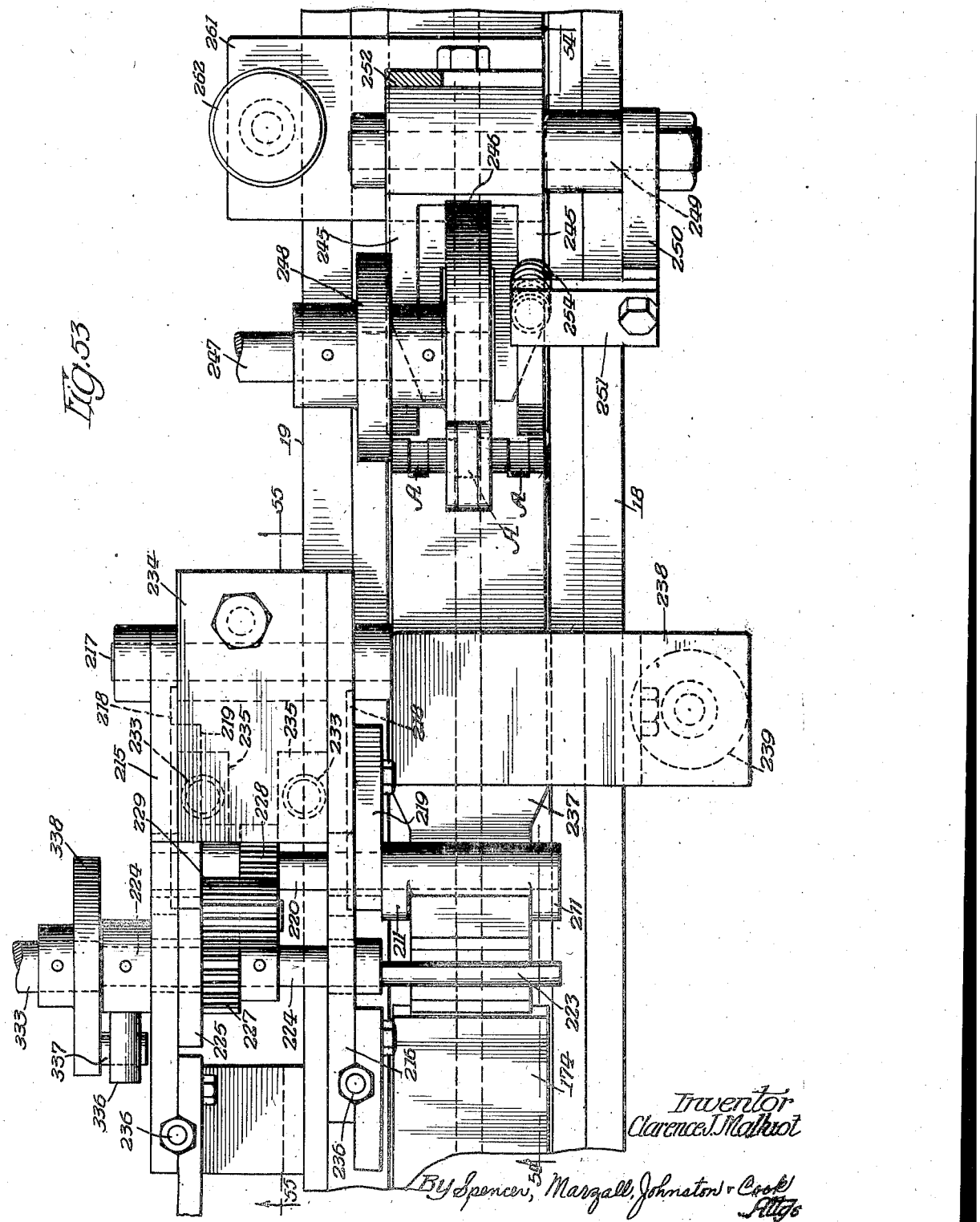

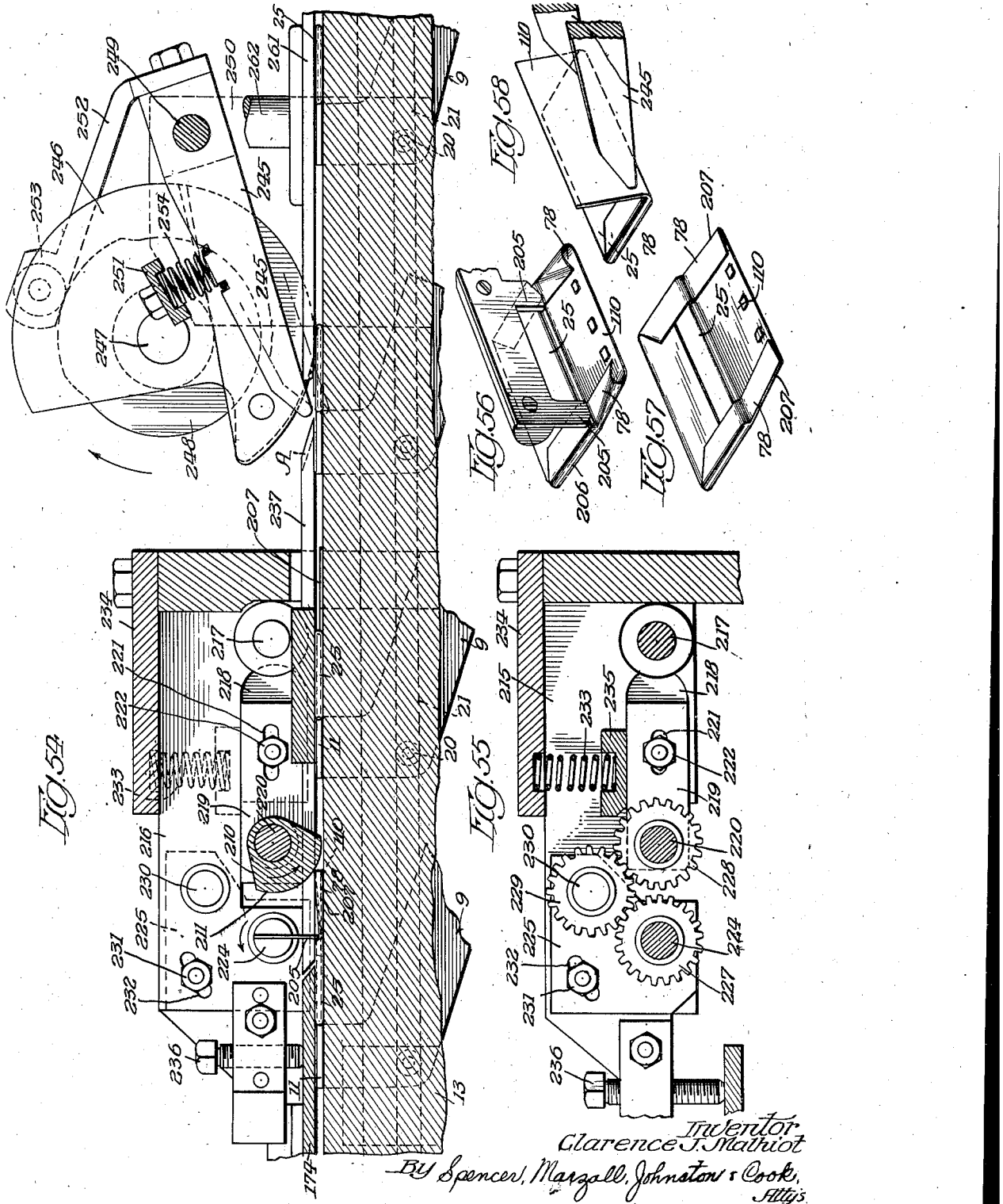

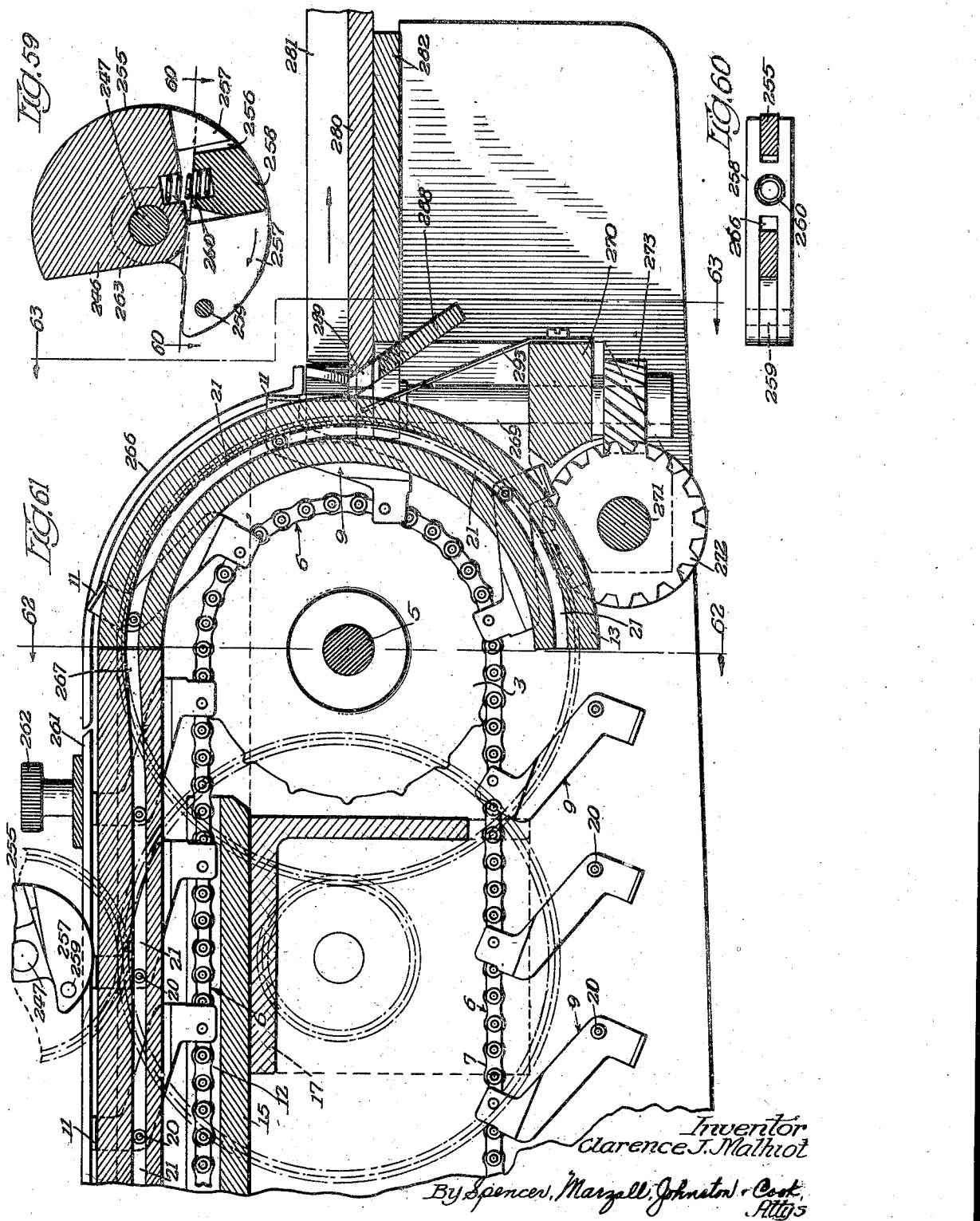

Aug. 26, 1947.                    C. J. MALHIOT                    2,426,314
                                 WRAPPING MACHINE
                            Filed May 8, 1942              22 Sheets-Sheet 21
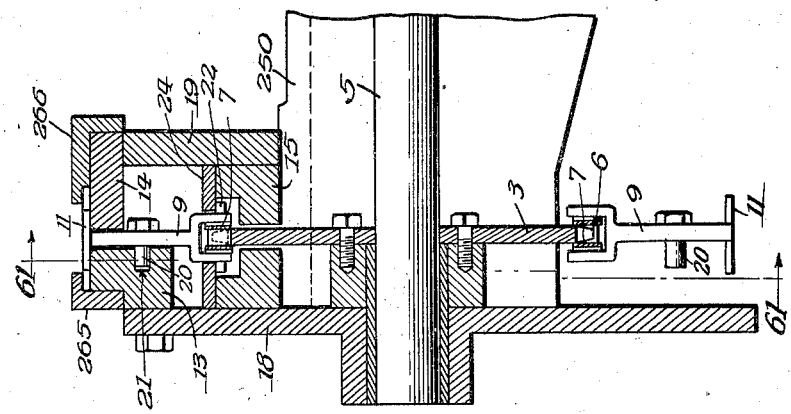
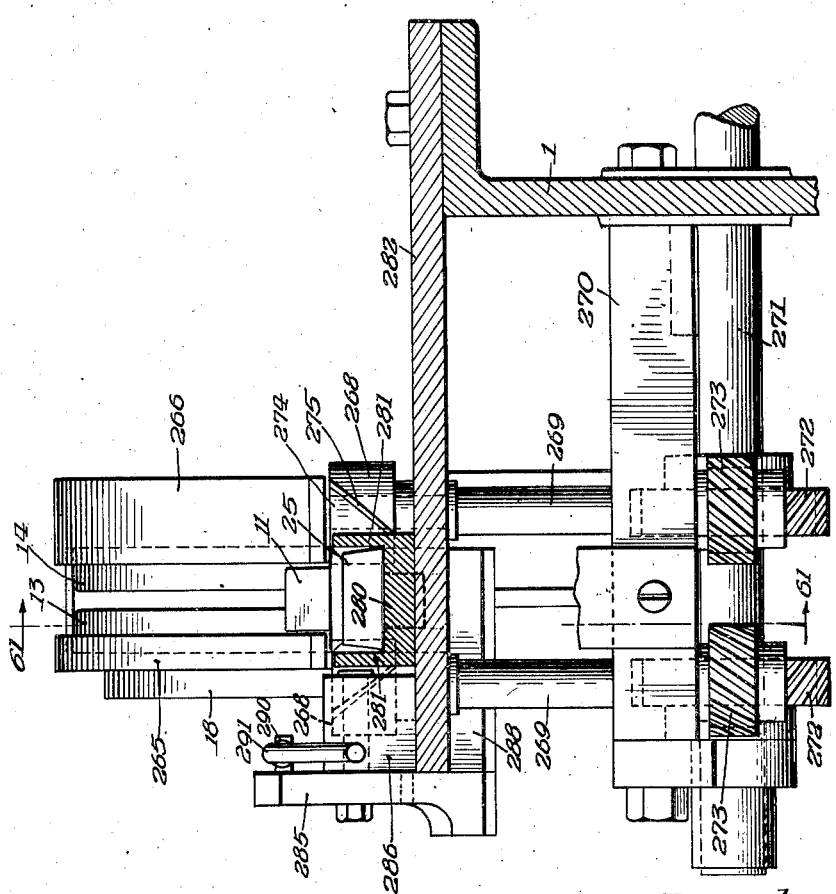
Inventor
Clarence J. Malhiot
By Spencer, Marzall, Johnston & Cook
Attys Aug. 26, 1947.   C. J. MALHIOT   2,426,314
WRAPPING MACHINE
Filed May 8, 1942   22 Sheets-Sheet 22
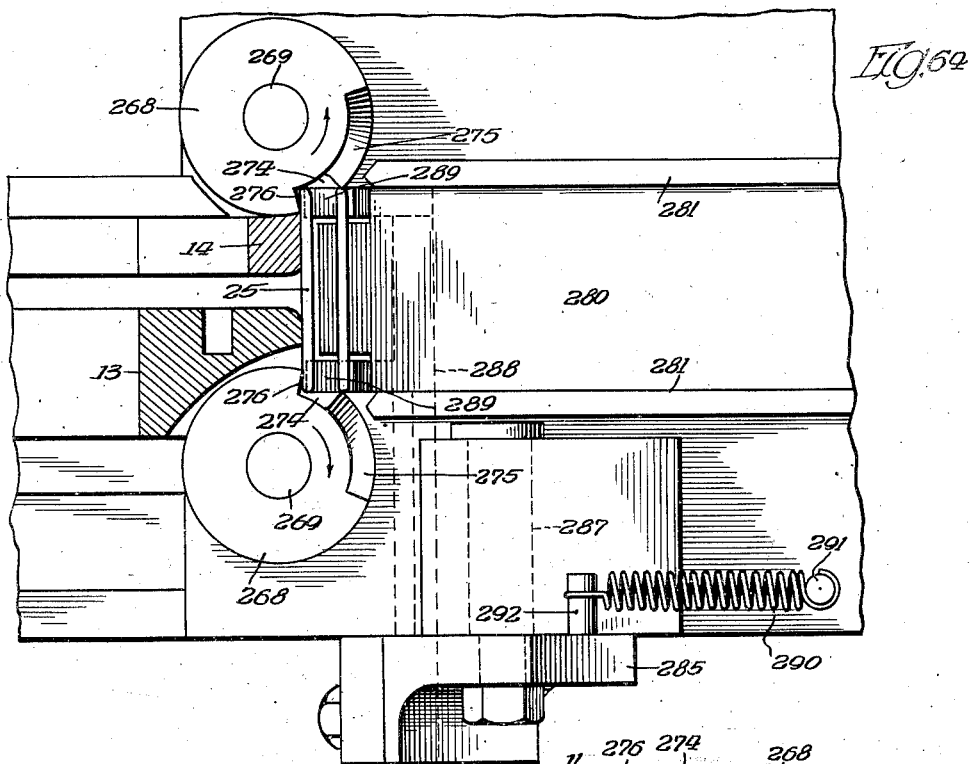
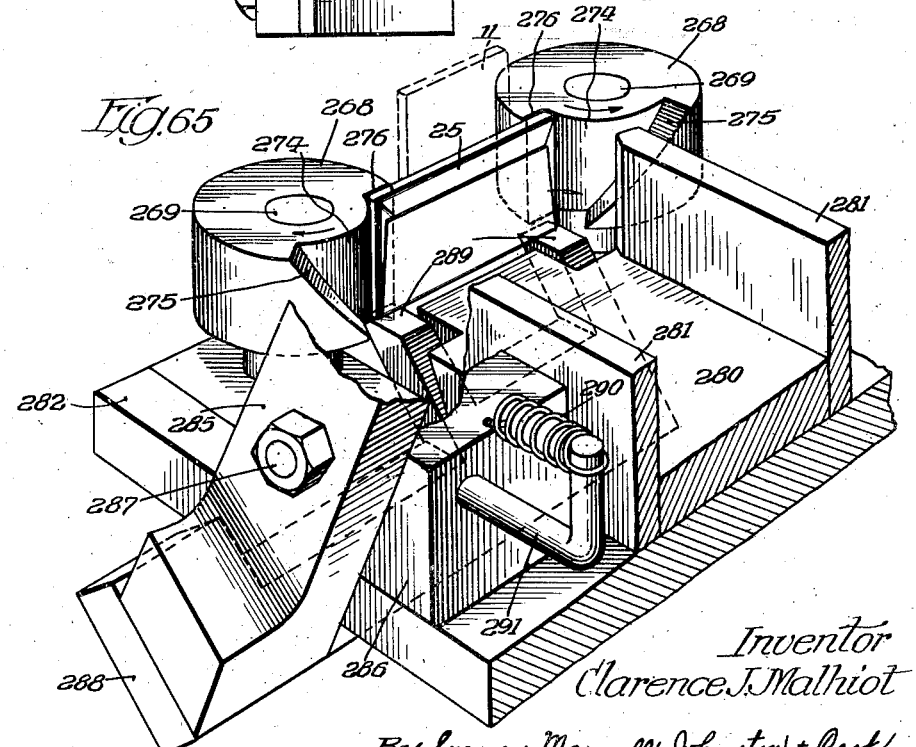
Inventor
Clarence J. Malhiot
By Spencer, Marzall, Johnston & Cook
Attys Patented Aug. 26, 1947

2,426,314

UNITED STATES PATENT OFFICE 2,426,314

WRAPPING MACHINE

Clarence J. Malhiot, Oak Park, Ill., assignor to F. B. Redington Co., Chicago, Ill., a corporation of Illinois Application May 8, 1942, Serial No. 442,205

7 Claims. (Cl. 93—2)

1

This invention relates to an apparatus and method for wrapping articles, and particularly to wrapping articles which are relatively small and thin, such as razor blades.

One of the principal objects of the invention is to provide new and novel means for wrapping articles, such as razor blades, at a constant high speed.

Another object of the invention is the provision of new and novel means for effecting a tight wrap about the article to be wrapped by ironing the edges of the wrapper at the flap, and for pressing the wrapper tightly and snugly against the article.

A further object of the invention is the provision of a wrapping machine for articles, including razor blades, whereby improved means are provided for effecting a tight wrap and ironing the wrapper against the edge of the article and for effecting a particular crease at the final folding operation so that no part of the end fold will protrude beyond the side edges of the article wrapped.

Still another object of the invention is the provision of improved means for discharging the wrapped articles to a predetermined unloading position, and for discharging damaged articles at a different predetermined position.

Still another object is the provision of a transfer wheel for transferring partially wrapped articles from one position to another, whereby the articles are reversed in position to effect further and additional folding or creasing operations on the wrapper about the article.

Still another object of the invention resides in the provision of a new and improved type of transfer or reversing wheel of a novel construction whereby the articles may be fed continuously and at a rapid rate of speed into the wheel. The said transfer or reversing wheel has pockets particularly designed to receive the articles continuously during continuous rotative movement of the transfer or reversing wheel.

Another object of the invention is the provision of a continuous motion wrapping process and apparatus in which an article is completely wrapped and discharged while traveling in substantially a straight line.

A further object is to provide an apparatus for inverting or reversing the article during the wrapping operation, while the partially wrapped article is traveling in substantially a straight line.

A still further object is the provision of an improved coordinated drive and feed between the article to be wrapped and the wrapper in which

2 the article is to be wrapped, whereby the wrapper is tightly folded about the leading edge of the article.

A still further object is the provision of a coordinated variable speed drive for the wrapper cutting-off knife, whereby a shaft and a rotary knife blade of suitable dimensions may be utilized, and yet the rotary cutting-off knife will be moving at a relatively slow speed which corresponds to the feeding speed of the wrapper during the cutting operation.

A still further object is the provision of a reversing mechanism for inverting an article during continuous forward feed, the mechanism being provided with means for maintaining a partially wrapped article in a predetermined wrapped position during feed into, along and out of the mechanism.

A further object is the provision of a variable speed drive for an article inverting and reversing wheel in a continuous motion wrapping process, the drive being coordinated to the continuous feed of the articles into and out of the wheel, and providing for relatively slow movement of the wheel during such feeding operations.

Another object is the provision of a continuous moving article conveyor which is adapted to feed partially wrapped articles into an inverting or reversing mechanism, and thereafter pick up articles from the inverting mechanism and move the same through further wrapping stations.

These and other objects will be apparent from the following description, the appended claims and the accompanying drawings, which illustrate a selected embodiment of the invention, and in which:

Fig. 2 is a front elevation of the right-hand portion of the machine illustrated in Fig. 1, the two views partially overlapping;

Fig. 3 is a plan view of the apparatus shown in Fig. 1, certain parts being omitted for clarity;

Fig. 4 is a plan view of the apparatus shown in Fig. 2.

Fig. 5 is an enlarged fragmentary section taken along the line 5—5 of Fig. 3 and illustrating the mechanism at the feeding end of the machine;

Fig. 6 is a sectional detail taken along the line 6—6 of Figs. 3 and 5;

Fig. 7 is a sectional detail taken along the line 7—7 of Fig. 3;

Fig. 8 is a perspective view illustrating the manner in which a pusher element engages an article in accordance with the present invention;

Fig. 9 is a sectional detail taken along the line 9—9 of Fig. 3;

Fig. 10 is a perspective view illustrating an article just about to engage a wrapper;

Fig. 11 is a section taken along the line 11—11 of Fig. 3;

Fig. 12 is a sectional detail taken along the line 12—12 of Figs. 3 and 9;

Fig. 13 is a detail view taken on the line 13—13 of Fig. 12;

Fig. 14 is a detail view taken on the line 14—14 of Fig. 12;

Fig. 15 is a sectional detail taken on the line 15—15 of Fig. 12 and illustrating the relative position of the article and wrapper at the time of wrapper cut-off;

Fig. 16 is a perspective view of the article and wrapper at the time of cut-off illustrated in Fig. 15;

Fig. 20 is a plan view of the mechanism illustrated in Fig. 17;

Fig. 21 is a detail view illustrating the article shortly after engagement with the end flap tucking member;

Figs. 22 and 23 are fragmentary views illustrating the operation of the presser rolls on the tucked end flaps of the article wrapper;

Fig. 24 is a transverse sectional detail taken on the line 24—24 of Figs. 3 and 20;

Fig. 25 is a perspective view of the wrapper with its end flaps rolled down;

Fig. 26 is a fragmentary plan view of the apparatus for folding down the wrapper end flaps;

Fig. 27 is a sectional view of the apparatus shown in Fig. 26, the view being taken along the line 27—27 of Fig. 26;

Fig. 28 is a sectional detail taken on the line 28—28 of Fig. 26;

Fig. 29 is a perspective view illustrating the wrapper with its end flaps folded down;

Fig. 30 is a sectional detail taken on the line 30—30 of Fig. 27;

Fig. 31 is an enlarged detailed section further illustrating the manner of folding down the wrapper end flaps;

Fig. 32 is an enlarged detailed section illustrating a further step in the operation of folding down the wrapper end flaps;

Fig. 33 is a longitudinal section taken on the line 33—33 of Fig. 3 and illustrating the wheel for reversing the position of the partially wrapped articles;

Fig. 34 is a perspective view showing the position of the partially wrapped article as it is fed into the reversing wheel of Fig. 33;

Fig. 35 is a perspective view of the partially wrapped article as it is discharged from the reversing wheel;

Fig. 36 is a sectional detail taken on the line 36—36 of Figs. 1 and 33;

Figs. 37, 38 and 39 are detail views illustrating the manner in which the article is inserted within the reversing wheel of Fig. 33;

Figs. 40, 41 and 42 are detail views illustrating the manner in which the article is discharged from the reversing wheel;

Fig. 43 is a transverse section taken through the reversing wheel as indicated by the line 43—43 of Fig. 1;

Fig. 44 is a transverse sectional detail taken on the line 44—44 of Figs. 1 and 33;

Fig. 45 is a fragmentary plan view of the apparatus for folding down the end flaps of the wrapper;

Fig. 46 is a transverse sectional detail taken on the line 46—46 of Fig. 45;

Fig. 47 is a transverse sectional detail taken on the line 47—47 of Fig. 45;

Fig. 48 is a sectional detail taken on the line 48—48 of Fig. 4;

Fig. 49 is a sectional detail taken on the line 49—49 of Fig. 4;

Fig. 50 is a perspective view illustrating a fragmentary portion of the apparatus shown in Fig. 45;

Fig. 51 is an enlarged sectional detail illustrating one of the steps in folding the wrapper end flaps;

Fig. 52 is an enlarged sectional detail illustrating a further step in the folding of the wrapper end flaps;

Fig. 53 is a fragmentary plan view of the side flap tucking and creasing mechanism and the mechanism for folding down the side flap;

Fig. 54 is a longitudinal sectional view of the mechanism illustrated in Fig. 53, the section being taken along the line 54—54 of Fig. 4;

Fig. 55 is a sectional detail taken on the line 55—55 of Figs. 4 and 53;

Fig. 56 is a perspective view illustrating the operation of the side flap tuckers;

Fig. 57 is a perspective view illustrating the article and wrapper after creasing and rolling down of the wrapper side flaps;

Fig. 58 is a perspective view illustrating a portion of the operation of folding down the wrapper side flaps;

Fig. 59 is a detail view of the creaser for the wrapper side flaps;

Fig. 60 is a sectional detail taken on the line 60—60 of Fig. 59;

Fig. 61 is a fragmentary longitudinal section taken at the right-hand end of the machine as indicated by the line 61—61 of Fig. 4;

Fig. 62 is a transverse sectional detail taken on the line 62—62 of Fig. 61;

Fig. 63 is a transverse sectional detail taken on the line 63—63 of Fig. 61;

Fig. 64 is a horizontal sectional detail taken on the line 64—64 of Fig. 2 and illustrating the discharge mechanism for the articles; and Fig. 65 is a perspective view illustrating the discharge mechanism for the articles.

Figure 1:
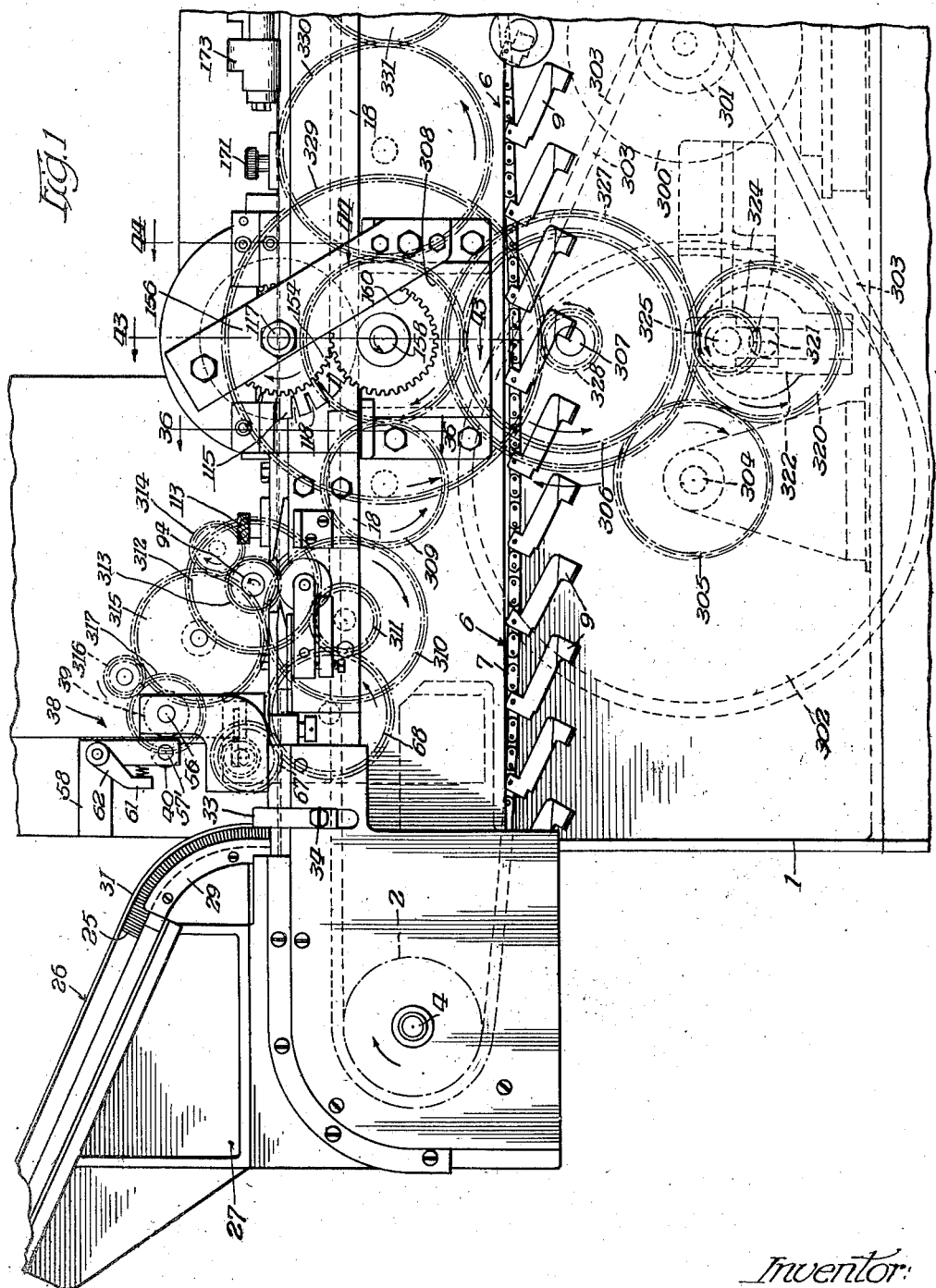
Fig. 1 is a front elevation of the left-hand portion of a machine constructed in accordance with the present invention.

The particular machine herein shown for the purpose of illustrating the invention comprises a vertical main frame 1, which extends longitudinally of the machine and supports the various operating parts thereof.

Article conveying mechanism

A pair of sprockets 2 and 3 are mounted upon shafts 4 and 5, which are suitably supported upon main frame 1, and these sprockets carry a conveyor chain 6. The chain 6 comprises a plurality of links 7 pivotally joined together with rollers 8, Fig. 7, therebetween.

A plurality of substantially T-shaped article advancing or pusher members 9 are pivotally connected to the conveyor chain 6. Each of the pusher elements 9 comprises a stem portion 10, Figs. 6 and 7, and a pusher portion 11. The pusher elements 9 travel along guide rails 12, 13 and 14, during operative movement. Guide rail 12 is mounted in a substantially U-shaped channel 15 which extends between the upper portions of the sprockets 2 and 3 and is supported at the left-hand end of the machine by a U-shaped bracket 16, Fig. 5, and at the right-hand end of the machine by a T-shaped bracket 17, Fig. 61. The rollers 8 of the conveyor chain are adapted to travel along the upper surface of the guide rail 12 and to be guided thereby.

The guide rails 13 and 14 are suitably attached to side plates 18 and 19 which extend throughout the length of the machine. The guide rails 13 and 14 provide a table for supporting the article, such as a razor blade, to be wrapped, and also as a guide for the upper portions 11 of the pusher members 9. These guide rails extend from a position adjacent the lower end of the left-hand sprocket 2, as shown in Fig. 5, to a position adjacent the lower end of the sprocket 4 as shown in Fig. 61.

Each of the pusher members 9 is also provided with a pin 20 which is adapted to ride within a cam groove 21 provided in the guide rail 13. The cam groove 21 extends throughout the length of the guide rail 13 and provides for constantly controlling the pusher elements during the operative portion of their movement. A pivot pin 22 also extends outwardly from the pusher members 9 and is received beneath a pair of guide plates 23 and 24 mounted upon the channel member 15. The guide rails 12, 13 and 14 together with the pins 20 and 22, the cam groove 21 and the guide plates 23 and 24 provide for maintaining the pusher members always in proper position.

During the return travel of the conveyor 6, the pushers 9 are allowed to drop to a free position as shown in Figs. 1, 2, 5 and 61. The downward drop of the pushers is limited by engagement of a cross bar 294 with the links of the conveyor chain as shown in Fig. 5. At the left hand end of the machine the pins 20 of the pushers are guided into the cam groove 21 by an adjustably mounted guide 295 also shown in Fig. 5. Proper tension in the conveyor chain 6 is maintained by a sprocket 297 carried by a pivotally mounted arm 298, Fig. 2.

*Article feeding mechanism*

The articles 25 are fed to the guide rails 13 and 14 and the conveyor 6 by means of a magazine chute 26 which extends in a generally downward direction and is curved at the lower end so as to extend in a substantially vertical direction. The magazine chute 26 is suitably supported upon an angle bracket 27 and comprises a bottom wall 28, side walls 29 and 30 and an upper guide plate 31. The articles 25 are mounted endwise on the bottom plate 28 as illustrated in Fig. 1 so as to be presented flatwise to the guide rails 13 and 14, as clearly shown in Fig. 5. The bottom 28 of the magazine chute is suitably notched or cut away at its lower end to permit passage of the heads 11 of the pushers 9 therethrough as clearly indicated at 32 in Fig. 6.

The upper guide plate 31 of the magazine chute terminates a predetermined distance above the guide rails 13 and 14, and a gate block 33 is positioned within this spacing. As best shown in Figs. 1 and 7, the gate block 33 comprises an L-shaped member which is adjustably attached to the side plate 18 by means of a bolt 34 and is slidably received within a suitable groove provided in the side plate. The vertical positioning of the gate block 33 is such as to permit the lower-most article 25 to be moved out of the chute 26 upon engagement by one of the pusher members 9, while retaining all articles above the lower-most within the confines of the chute.

In accordance with the illustrated embodiment of the invention, the article 25 comprises of a razor blade having a thickened rear portion 35 and a band of paper material 36 arranged around the blade proper as best shown in Fig. 8. The pushers 9 are adapted to engage the thickened rear portion 35 as the blades are fed from the chute 26. Fig. 8 illustrates the manner in which the head 11 of the pusher 9 engages the article 25 to feed the same out of the magazine chute 26 and advance the article forward.

*Wrapper feed mechanism*

As the article 25 is advanced by the pusher 9, it next engages a wrapper 37 which is fed to the machine by suitable feed mechanism indicated generally by the reference numeral 38 in Fig. 1. The wrapper 37 is in the form of a continuous strip, such as from a roll of wrapping material, not shown, and is fed downwardly by means of a pair of feed rolls 39 and 40, Figs. 1 and 9. Three spots of adhesive, Fig. 16, are placed on the wrapper web by mechanism (not shown) previous to being received by the feed rolls 39 and 40. The spots are on the left side of the web, as viewed in Fig. 9, and the roll 40 has three grooves in line with these spots to prevent its picking up any adhesive, Fig. 12. The lower end of the wrapper as it is advanced by the feed rolls 39 and 40 is adapted to be received within a transverse groove 41 provided in the guide rails 13 and 14, as shown in Figs. 9, 10 and 15.

The timing of the parts is such that the article 25 engages the strip of wrapping material 37 just prior to the time that the strip would engage the lower end of the groove 41 as indicated in Fig. 10. Thereafter as the article is advanced by the pusher 9 the wrapper 37 is caused to be folded around the leading edge of the article as illustrated in Figs. 15 and 16. Thereafter a rotary cutting knife 42 cooperating with a fixed knife 43 provides for severing the continuous strip of wrapping material.

The timing of the cut-off knives 42 and 43 is such that the wrapper is partially folded around the forward edge of the article as indicated in Figs. 15 and 16 prior to the cut-off operation. The timing of the parts is also such that the article 25 is advanced by the pusher 9 at a speed that is greater than the feeding speed of the wrapper by the feed rollers 29 and 40. The wrapper feed rolls thereby draw back upon the wrapper during the initial folding of the wrapper about the forward edge of the article and provide a very tight and neat fold about this forward edge.

During the downward feeding of the wrapper the strip 37 is guided between lower guide members 44 and 45 and upper guide members 46 and 47, Figs. 5, 9 and 12. The lower guide members 44 and 45 comprise upwardly extending portions of top plates 48 and 49, respectively, which overlie the article on the guide rails 13 and 14 and maintain the article in proper position on the guide rails. The upper guide members 46 and 47 are mounted upon suitable posts or brackets, such as the bracket 50 of Figs. 9 and 12, which extend outwardly from the main frame 1.

The bracket 50 also supports an angle member 51 which is bolted to the bracket as indicated at 52, Figs. 9 and 12, and carries the fixed cut-off knife 43. The rotary knife 42 is mounted in an enlarged part 53 of the shaft 54. The shaft 54 is rotatably mounted in suitable bearings carried by the main frame 1 and an auxiliary frame 55, Fig. 12.

The wrapper feed roll 39 is attached to a shaft 56 which is also rotatably carried by the main frame 1 and the auxiliary frame 55. The shaft 56 is adapted to be driven at a constant speed as hereinafter more fully described. The wrapper feed roll 40 is mounted upon a shaft 57' which is rotatably carried by a pair of arms 57 pivotally mounted upon a suitable frame member 58 as indicated at 59 in Fig. 9. The roll 40 is resiliently urged into contact with the roll 39 by means of a pair of springs 60 compressed between the arms 57 and lugs 61 carried by arms 62 rigidly mounted on the frame member 58.

A pair of intermeshing gears 63 and 64 attached to the shafts 56 and 57 provide for driving the two wrapper feed rolls 39 and 40 in synchronism.

While the wrapper feed rolls 39 and 40 rotate at a constant speed, as above described, the shaft 54 carrying the rotary knife blade 42 is driven at a variable speed. This is for the purpose of providing a knife supporting member 53 of satisfactory diameter and strength and at the same time to provide for rotating the knife blade in proper timed relationship with the feed of the wrapping strip and at the same speed as the feed of the wrapper during the actual cut-off operation. To this end the shaft 54 has a plate 65, Figs. 9, 12, 13 and 14, attached thereto, and the plate 65 carries an eccentrically mounted roller 66. A gear 67 is mounted upon a stub shaft 68ᵃ which is carried by an auxiliary frame member 69 and is eccentrically positioned with respect to the shaft 54 as clearly shown in Figs. 9 and 13. The gear 67 carries a channel shaped member 70 adapted to receive the roller 66 within the channel groove thereof. Gear 67 is driven at a constant speed by means of a gear 68 in a manner hereinafter more fully described. Thus as the gear 67 rotates, the shaft 54 and rotary cutting knife 42 are driven at a predetermined variable speed by means of the connection between the roller 66 and channel member 70.

*End flap tucking and rolling mechanism*

As the article continues to move forwardly under the action of the pusher 9 it next engages a pair of end flap tucking members 75 which provide for applying an end tuck 76, Figs. 18 and 20 to 23, in the forward folded edge 77 of the outwardly extending wrapper end flaps 78, Figs. 16, 18, 21 and 23.

Figure 17:
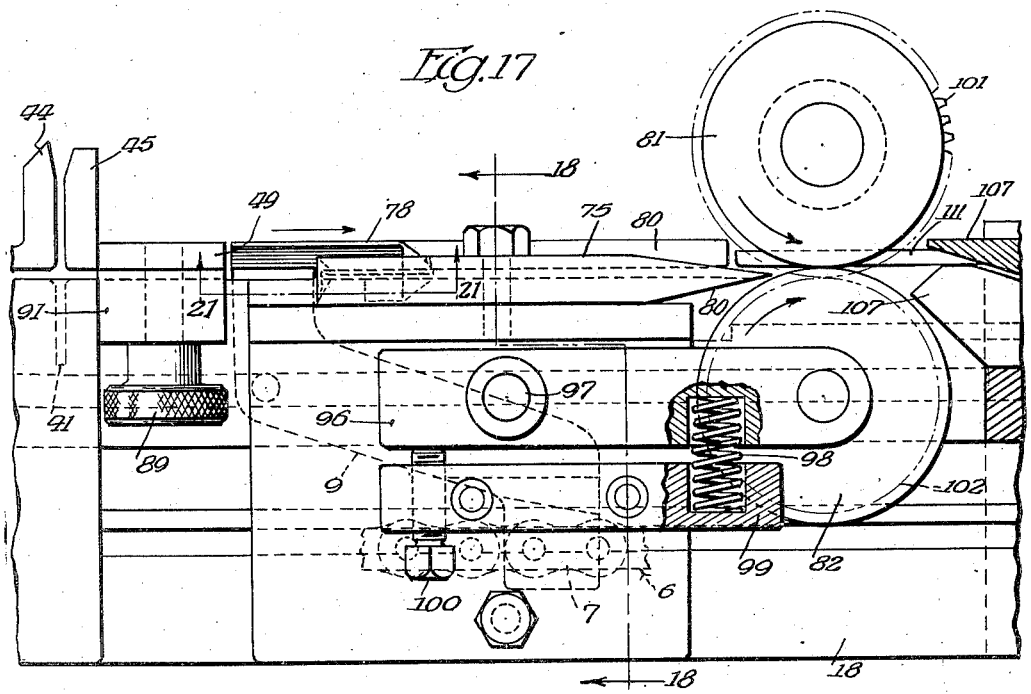
Fig. 17 is a fragmentary elevation showing the tucking and rolling mechanism for the end flaps of the wrapper.
Figure 18:
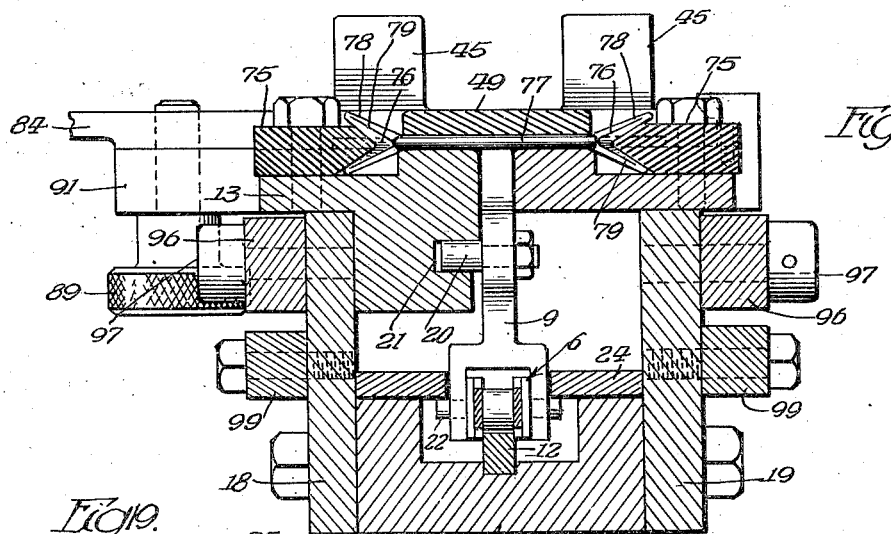
Fig. 18 is a sectional detail taken on the line 18—18 of Fig. 17.
Figure 19:
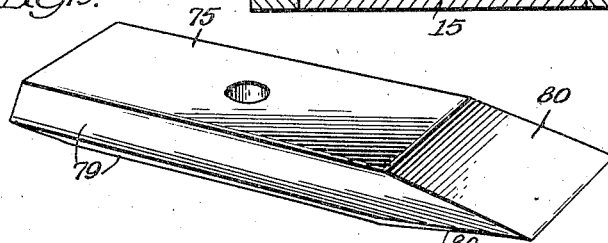
Fig. 19 is a perspective view of one of the end flap tucking members.

The tuckers 75 comprise longitudinally extending bars which are bolted to the guide rails 13 and 14 and have substantially V-shaped tucking faces 79, best shown in Figs. 18 and 19. A pair of tapering surfaces 80 are also provided on the right-hand end of the tucker bars 75, Figs. 17, 19 and 20, and provide for feeding the tucked end flaps into presser rolls 81 and 82 which iron down the tucks in the end flaps.

The partially wrapped article travels under the top plate 49 during movement of the article along the tucking member 75. This top plate, Figs. 3, 17 and 20, extends from the wrapper feed position to a position adjacent the presser rolls 81 and 82. Provision is made for detachably mounting this top plate 49 on the machine, whereby the apparatus underneath is readily accessible.

The top plate 49, Figs. 3, 12 and 20, includes an extension 83 and an arm 84. The extension 83 is adapted to be slidably received beneath an overhanging flange 85 provided on an angle member 86 attached to the guide rail 14. A pin 87 is mounted in the flange 85 and is adapted to be received within a slot 88 provided in the extension 83 of the top plate, thereby to properly position the top plate. A thumb screw 89 threads into the arm 84 of the top plate and is received within a notch 90 provided in an outwardly extending portion 91 of the guide rail 13. The thumb screw 89 thus assists in properly positioning the top plate and also serves to maintain the top plate removably in position.

After the end tucks 76 have been applied to the wrapper end flaps the tucked end flaps are rolled down by the rolls 81 and 82 as above described. The rolls 81 and 82 are arranged in two pairs, Figs. 3, 20 and 24, so spaced as to engage the wrapper end flaps just outside of the ends of the article as clearly shown in Figs. 22 and 23. The spaced upper rolls 81 are integrally joined together by a hub 92 which is attached to an overhanging shaft 93 having an enlarged portion 94 suitably supported on the machine frame.

The lower rollers 82 are individually mounted on shafts 95 carried by bracket arms 96 pivotally connected to the side members 18 and 19 as indicated at 97, Figs. 17, 18 and 20. Each of the rolls 82 is spring urged towards its cooperating roll 81 by springs 98, Figs. 17 and 24, compressed between the arms 96 and a bar 99 bolted to the side plates 18 and 19.

A set screw 100, Fig. 17, also threads through the bar 99 and limits the movement of the roll 82 towards roll 81 under action of spring 98. By means of the set screw 100, a predetermined spacing is maintained between the rollers 81 and 82, thereby to avoid wrinkling or crumpling of the wrapper end flaps during ironing. The shaft 94 is adapted to be driven at a constant speed substantially equal to the speed of the partially wrapped article as hereinafter described, and intermeshing gears 101 and 102 attached to the shafts 93 and 95, respectively, provide for operating the cooperating pairs of rolls 81 and 82 in synchronism. After the ironing operation by the rolls 81 and 82 the partially wrapped article has the appearance illustrated in Fig. 25.

*First end flap folding apparatus*

The partially wrapped article is next moved past a pair of stationary end folders which provide for bending the tucked end flaps of the wrapper downwardly. Each of these end folders comprises a longitudinally extending bar 105, Figs. 26, 27 and 30, which is bolted to the respective side plates 18 and 19 and is provided with downwardly inclined folding surface 106, Fig. 27, the inclined folding surfaces preferably having a spiral lead to assist in the folding action. The folders 105 are so arranged that as the article 25 is advanced along the guide rails 13 and 14 by a pusher member 9, the inclined surfaces 106 engage the outwardly extending end flaps 78 of the wrapper and gradually fold these flaps from the substantially horizontal position illustrated in Fig. 25 and by the dashed lines in Fig. 30 to a vertically downward position illustrated by the full lines in Figs. 27 to 32.

A means is also provided for assuring that the end flaps 78 will be neatly and sharply folded downwardly about the ends of the article 25. This means comprises a pair of thin, elongated blades 107 which are screwed to the guide rails 13 and 14 and extend upwardly a slight distance above the tops of the rails as best shown in Fig. 31. Thus, as the article 25 moves along the guide rails and the folders 105, the end flaps 78 of the wrapper are caused to fold sharply around the blades 107 as is also clearly shown in Fig. 31. The blades 107 are provided with forwardly extending portions 108 which are vertically tapered, Fig. 27, and outwardly flared, Fig. 26, to assist in the movement of the wrapper thereon. The blades also terminate short of the length of the folders 105 as clearly shown in Fig. 26. Thereafter the inner faces 108 of the folders 105 extend inwardly towards the rails 13 and 14 as indicated at 109 in Fig. 26 so as to iron the downfolded flaps 78 between the folders and rails as shown in Figs. 28 and 32.

During movement of the articles past the folders 105 the upper portion of the wrapper, which overhangs the article as indicated at 110, Figs. 25 and 29, is maintained folded about the article by a top plate 111. This top plate extends forwardly between the rollers 81 and 82 to a position adjacent the end of the top plate 49, and is removably fastened in position by a slotted bracket 112, Figs. 26 and 30, and a thumb screw 113 threaded into one of the folders 105.

*Article reversing wheel*

The continuously advancing article is next received by a reversing wheel which inverts the partially wrapped article from the position shown in Fig. 34 to the position shown in Fig. 35 while continuously advancing the article forwardly along a straight line. This reversing wheel comprises a pair of circular spiders 115, Figs. 33 and 43, so spaced as to receive the articles therein and yet permit passage of the pusher heads 11 therebetween as illustrated in Fig. 43. The spiders 115 are mounted upon shafts 116 and 117, Fig. 43, and are rotated as a unit as hereinafter described.

Figure 2:
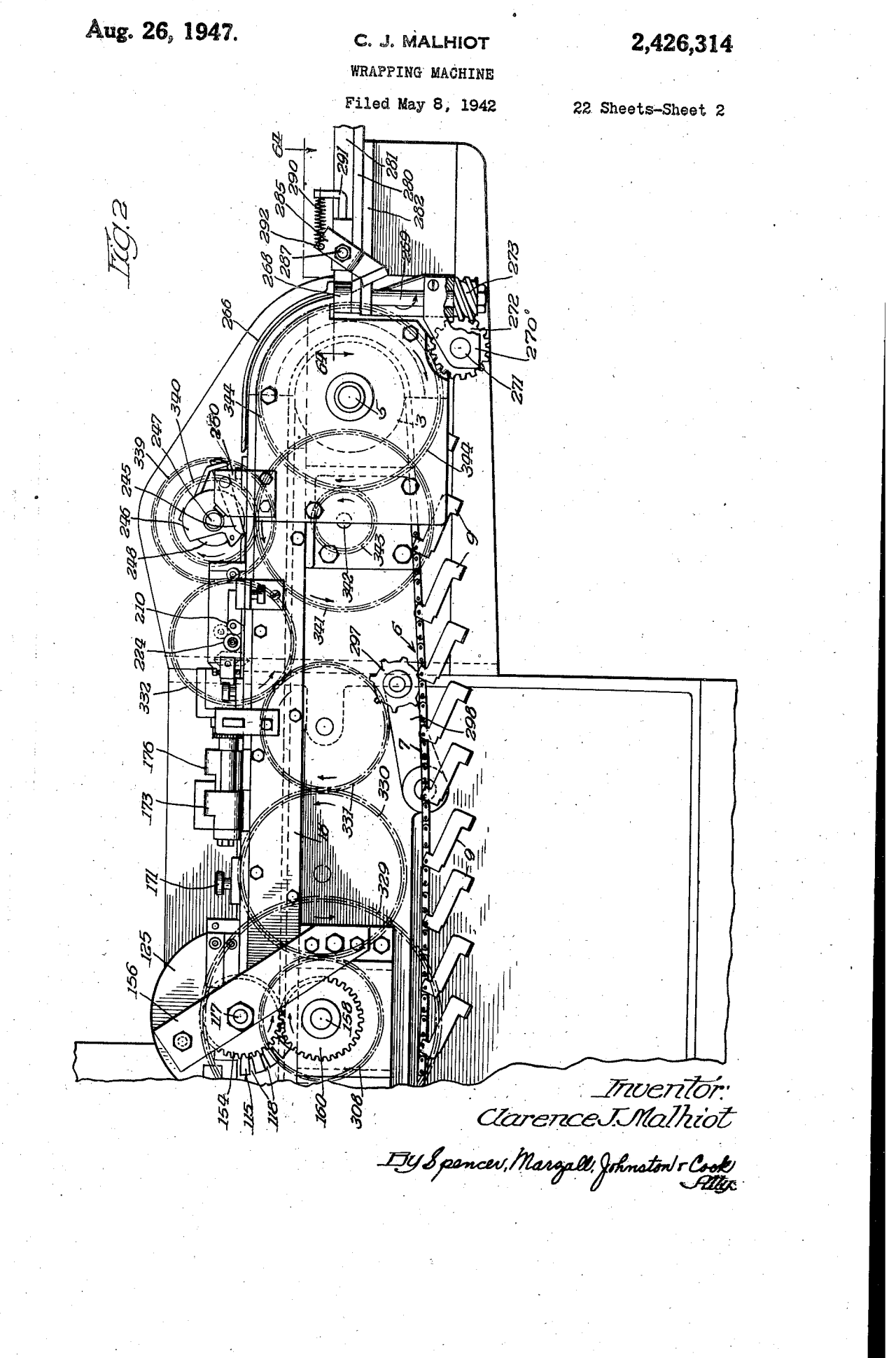

Each of the spiders 15 is provided with a plurality of article receiving pockets or notches 118, Figs. 1, 2 and 33, so spaced as to receive continuously advancing articles during continuous rotary movement of the reversing wheel. The articles are moved into the reversing wheel by the pushers 9 of the conveyor 6, and are picked up on the other side of the wheel by pushers 9 carried by the same conveyor 6. Figs. 33 and 37 to 39 illustrate the operation of the conveyor in feeding the article to the reversing wheel.

Referring to these figures it will be noted that the article receiving notches 118 are somewhat wider than the thickness of the article. As the article is advanced by the pusher 9 and pusher head 11, the timing is such that an upper portion of a notch 118 of the reversing wheel is in position to receive the article as shown in Fig. 37. Further continuous movement of the wheel and pusher causes the article to be inserted into the notch 118 as indicated in Fig. 38. Just prior to the complete insertion of the article in a notch 118 the pusher 9 including the head 11 is caused to drop by a lowered portion 119 of the cam groove 21 in the guide rail 13. This releases the pusher from the article and permits the pusher to continuously move forwardly while the article is rotatably carried by the reversing wheel.

The position of the drop in the cam track 21 is such that the pusher head 11 disengages the article at the critical point with respect to movement of the article by the reversing wheel. Since the pin 20 of the pusher which travels in the cam track 21 is cylindrical, the pusher head 11 gradually moves downwardly from the article as the pin 20 engages the drop in the cam track, and then suddenly drops to disengage the head 11 from the article. Guide rails 13 and 14 are suitably grooved as indicated at 122, Fig. 33, to permit the downward movement of the pusher head 11.

During movement of the article around the reversing wheel, the wrapper side flaps 78 are maintained in their folded condition by means of a pair of side plates 125, Figs. 33 and 36, which engage the folded flaps and hold them adjacent the sides of the spiders 115. A means is also provided to assure that the end flaps 78 remain sharply folded about the ends of the article during initial engagement of the article by the reversing wheel. This means is also best shown in Figs. 33 and 36.

Referring to these figures, a plate 126 is bolted to each of the members 125 and supports a spindle 127 on each of which a plate member 128 is pivotally mounted by means of forked arms 129 and 130. The plates 128 are provided with outwardly projecting lips 131 which are adapted to engage over the end edges of the article 25 and maintain the end flaps 78 tightly folded about the end edges of the article.

Springs 132 are compressed between the plates 128 and the plates 125, and pins 133, carried by the plate members 125, urge the plates 128 towards the end edges of the article. As the article moves upwardly, however, under action of the reversing wheel, the plates 128 are adapted to swing outwardly about the pivots 127 to permit upward movement of the article. During this action the lips 131 under action of the springs 132 continue to press against the downwardly folded end flaps of the wrapper and hold these flaps in tightly folded condition until engagement thereof by the plate members 125.

Inward movement of the plates 128 by springs 132 during reception of the article is limited by the plate members 125 which engage against a cut-out portion 134, Fig. 33, of the plate members. The lips 131 are also preferably flared as indicated at 135, Fig. 36, to provide for ready reception of the wrapper flaps 78 within the lips.

As above described, the inverted articles are again picked up at the opposite side of the reversing wheel by the conveyor 6. Since the reversing wheel is continuously rotating, it is necessary that the pusher heads 11 of the conveyor also move downwardly with the wheel during discharge of the articles from the pockets 118. For this purpose the cam track 21 for guiding the pins 20 is inclined upwardly and then inclined downwardly as indicated at 140 and 141 respectively in Fig. 33. The cam track then continues substantially in the plane of the track 21 as indicated by 142 in Figs. 33 and 40 to 42.

Figs. 40 to 42 illustrate the discharge operation of the articles from the reversing wheel. Fig. 40 shows the pusher head 11 just about to engage an article 25 during downward travel of the pusher on the inclined portion 141 of the cam track. Fig. 41 shows the article 25 partially removed from the reversing wheel during continued downward movement of the pin 20 in the cam track 141. In Fig. 42 the article has been entirely removed from the reversing wheel 115 and the pusher 11 has advanced beyond the wheel while the pin 20 is engaged in the straight cam portion 142.

During discharge of the article from the reversing wheel the end flaps 78, which are now turned upwardly, are clamped at their folds by a clamping mechanism generally similar to that at the feeding end of the reversing wheel. Thus, plates 143, Figs. 33 and 44, bolted to the side plates 125, support pivot pins 144 which pivotally carry plates 145 spring pressed by springs 146. Each of the plates 145 is provided with an inwardly extending lip 147 which is adapted to engage around the end edges of the article during discharge and maintain the wrapper tightly folded therearound. The end flaps are engaged by angle members 148 which maintain the end flaps in proper folded condition and prevent shifting of the package left to right as viewed in Fig. 44 during the discharge operation.

The right hand spider 115 of the reversing wheel, Fig. 43, is screwed to a gear 150 mounted on a sleeve 151 carried by the shaft 116 which supports this spider member. The shaft 116 is carried by a bracket 152 attached to an overhanging bracket 153 bolted to the main frame 1. The left hand spider member 115, Fig. 43, is screwed to a gear 154 rotatably mounted on a bushing 155 carried by the shaft 117. The shaft 117 is mounted in an inclined bracket 156, Figs. 1, 2, and 43, bolted to a U-shaped bracket 157 extending from the main frame 1, Figs. 3, 4 and 43.

A shaft 158 extends between the legs of the U-shaped bracket 157 and is suitably supported by the bracket and the main frame 1. The shaft 158 carries gears 159 and 160 which mesh with the gears 150 and 154. Thus, as the shaft 158 is rotated, the two spider members 115 are rotated in unison. The shaft 158 is adapted to be driven continuously but at a variable speed as hereinafter described, the drive being so coordinated with the movement of the conveyor 6 that the pockets 118 travel at a relatively slow speed during insertion of an article therein and travel at a more rapid speed between insertion of the articles.

*Second end flap folding mechanism*

The article with the flaps 78 extending upwardly is next passed through a mechanism providing for folding the upwardly extending end flaps downwardly against the body of the article. As the article leaves the reversing wheel, the article including the now forwardly extending wrapper portion 110 thereof, is engaged beneath a top plate 165 including a forwardly extending tapered portion 166 and a downwardly recessed portion. The downwardly recessed portion provides upwardly extending side walls 167, Figs. 45 and 46. Bars 168 and 169 are attached to the side plates 18 and 19, respectively, and together with the upwardly extending sides 167 of the top plate, form guides for the upwardly extending flaps of the article wrapper. The top plate 165 is removably supported on the apparatus by means of a slotted extension 170 which overlies the bar 169 and is removably attached thereto by a thumb screw 171.

The top plate 165 is cut away as shown at 172 in Figs. 45 and 46, and a rotary folder 173 is adapted to engage one of the upwardly extending end flaps 78 of the wrapper at this cut-away portion and fold the same down against the upper body portion of the article and wrapper. Thereafter, the article passes beneath a top plate 174 provided with a cut-away portion 175, Figs. 45 and 47, within which a rotary folder 176 operates to fold down the other end flap 78 of the wrapper. Each of the folders 173 and 176, Figs. 46, 47 and 48, comprises a cut-away portion 177 for feeding the articles. A folding face 178, and a circular portion 179 provide for ironing the folded down flaps. The dashed lines in Figs. 46 and 47 illustrate the operation of the folders.

Prior to the engagement of the folders 173 and 176 with the end flaps 78, a pair of blades 180 and 181 carried by the sides 167 of the top plate 165 and corresponding generally to the blades 107 engage the upwardly folded end flaps and maintain the flaps sharply creased at the folds as more clearly shown in Fig. 51. These blades extend to a position adjacent the respective rotary folders. During folding of the end flaps by the folders 173 and 176, the end flaps are maintained tightly creased about the edges of the article 25 by a pair of pivotally mounted members 182, one for each folder, which are carried by brackets 168' and 169' and are secured to the brackets by pivot pins 183 extending through lugs 184, Figs. 47, 48 and 50, provided on the members 182.

Springs 185 compressed between the members 182 and upwardly extending portions of the brackets 168' and 169' provide for resiliently pressing the members 182 towards the ends of the article. Fig. 52 more clearly illustrates the operation of the clamping members 182. After the end flaps have been folded down by the folders 173 and 176 they are maintained in proper folded condition by the top plate 174 and a pair of side plates or bars 186 and 187 which engage the wrapper at the ends of the article. The top plate 174 is removably maintained in position by an extension 188 which overlies the bar 187 and is secured to the bar by a thumb screw 189.

The entire rotary folding mechanism is pivotally mounted to provide for swinging the mechanism to a position providing free access to the parts therebelow. Referring to Figs. 4 and 49 the folders 173 and 176 are mounted on shafts 190 and 191, respectively, and those shafts are rigidly supported in a pair of arms 192 and 193, the arm 193 having a handle 194 providing for lifting the mechanism. The arms 192 and 193 are pivotally mounted on a shaft 195 carried by brackets 196 and 197, Fig. 4, attached to the main frame 1.

The shaft 195 has a gear 196 attached thereto which meshes with an idler gear 197 mounted on a shaft 198 secured to the arm 193. The gear 197 meshes with a gear 199 secured to the folder 176. The gear 199 in turn meshes with a gear 200 attached to the folder 173. Thus as the shaft 195 rotates the two folders 173 and 176 are rotated in proper timed relationship.

*Side flap tucking and creasing mechanism*

The folded over end flaps 78 of the wrapper are next tucked and creased so as to provide a very neat fold and package when the now forwardly extending portions 110 of the wrapper are folded down upon the article to give a completely wrapped article. For this purpose a pair of rotatably mounted tucking fingers 205, Figs. 54 and 56, engage the folded down end flaps 78 of the wrapper as the partially wrapped article passes from beneath the top plate 174. The timing of the parts is such that the tuckers 205 engage the forwardly extending portion 110 of the wrapper just in advance of the now leading side of the article 25, as more clearly shown in Fig. 56.

The tucking fingers 205 are so shaped, Fig. 56, as to engage the folded flaps 78 inwardly of the outer end edges 206 of the article so as to cause the forwardly projecting flap portions to be rolled inwardly as also illustrated in Fig. 56. Thus, if the rolled over flaps be creased while engaged by the tucking fingers 205, the side edges 207 of the forwardly extending wrapper portion 110 will taper inwardly as shown in Fig. 57.

This creasing is accomplished by a side flap creaser 210 having creasing portions 211. The relative rotation of the tuckers 205 and the creaser 210 with respect to the advance of the article is such that the creaser portions 211 engage the rolled flaps 78 prior to release thereof by the fingers 205. The forwardly projecting portions of the end flaps 78 are thus rolled down in tapered relationship as illustrated in Fig. 57.

To prevent breakage in the event that the tuckers 205 or the creaser 210 engage against the article itself or some other obstruction, the entire side flap tucking and creasing mechanism is pivotally mounted. The tucker and creaser are thus mounted upon a pair of arms 215 and 216 which are pivotally mounted as indicated at 217, Figs. 53 and 54. Each of the arms 215 and 216 are provided with grooved portions 218 which slottably receive plates 219 supporting a shaft 220 carrying the creaser 210. The plates 219 are provided with an elongated slot 221, Fig. 54, which provide for adjusting the creaser 210 in proper position with respect to the tucking fingers 205. The plate 219 is adapted to be locked in adjusted position by nuts 222 threaded upon bolts extending through the slots 221.

The tucking fingers 205 are carried by a member 223 which is mounted upon a shaft 224. The shaft 224 is carried by the arm 215 and provides a pivotal support for a plate 225. A gear 227 is mounted upon the tucker shaft 224 and a gear 228 axially displaced from the gear 227 is attached to the creaser shaft 220. A wide faced idler gear 229 mounted upon a shaft 230 carried by the plate 225 provides for driving the gear 228 from the gear 227.

The plate 225 together with the gear 229 carried thereby is pivotal about the shaft 224 always to maintain the idler 229 in mesh with the gear 228 upon adjustment of the plate 219. The plate 225 is maintained in adjusted position by means of a nut 231 threaded upon a bolt extending through an arcuate slot 232 provided in the plate 225. The arms 215 and 216 are resiliently urged towards the article by springs 233 which are compressed between an overhanging bracket member 234 and lugs 235 attached to the arms 215 and 216. Downward movement of the arms 215 and 216 under action of the springs 233 is limited by set screws 236 mounted on the ends of the arms 215 and 216. During passage under the tuckers 205 and creaser 210, the articles are maintained in position on the guide rails 13 and 14 by means of a top plate 237 which is maintained in position by an extension 238 and a thumb screw 239.

Side flap folding mechanism

After the end flaps 78 have been tucked and creased as above described, the forwardly projecting portion 110 of the wrapper is folded down upon the article, thereby completing the wrapping operation. The side flap folders first comprise a pair of bars 245 which engage under the flap portion 110 as the article is advanced and are then raised to the position illustrated by full lines in Fig. 54 to fold the portion 110 upwardly as indicated in Fig. 58. The folders 245 originally occupy a position below the side flap 110 as illustrated by the dashed lines in Fig. 54 and are moved upwardly to engage the forwardly extending side flap 110 only as the articles are advanced beyond the top plate 237. Three grooves are provided in top plate 237 as shown at "A," Figs. 53 and 54, to prevent the top plate from picking up adhesive from the side flap 110 when it is laid over the top of the package.

After the side flaps 110 have been raised by the arms 245 a folder and presser member 246 engages the flaps 110 and folds them down against the body of the article. The folder and presser 246 is mounted upon a rotary shaft 247 upon which a cam 248 is mounted. The folder and presser 246 engages the forwardly extending side flap 110 after the latter has been raised by the arms 245 and folds the same downwardly against the upper portion of the article.

The arms 245 are pivotally mounted upon a pin 249 supported in a bracket 250 which has a plate 251 bolted thereto. An arm 252 is bolted to the arms 245 and is provided with a roller 253 adapted to engage the surface of the cam 248 as shown in Fig. 54. The cam 248 is mounted upon the same rotary shaft 247 which supports the folder and presser 246. A spring 254 is compressed between the plate member 251 and one of the arms 245 normally to urge the arms in a downward direction. Upon engagement of the roller 253 with the upwardly extending surface of the cam 248, however, the arms 245 are moved upwardly and fold the portion 110 of the wrapper upwardly as illustrated in Fig. 58.

The construction of the combined folder and roller 246 is best illustrated in Figs. 59 and 60. As therein shown the member 246 comprises a generally circular member 255 provided with a slot 256 and cut-away portions 257, Fig. 59, on each side of the member adjacent the slot. A generally H-shaped member 258, Fig. 60, having a curved outer surface is mounted in the slot 256 and cut-away portions 257 of the member 255 and is pivotally connected to the member as indicated at 259. A spring 260 compressed between the members 255 and 258 urges the member 258 outwardly. Thus as the folder 246 rotates the spring pressed member 258 engages the now upwardly extending wrapper side flap 110 and resiliently folds the same downwardly against the article as the article is advanced by the conveyor 6.

Outward movement of the folding member 258 of the folder 246 under action of spring 260 is limited by engagement of the member with one of the walls of the slot 256 as shown in Fig. 59. The bracket 250 which supports the folding arms 245 is bolted to the side plate 19 and extends upwardly therefrom as shown in Fig. 2. A top plate 261 carried by a part of the side plate 19 is removably attached thereto by a thumb screw 262. The central member 255 of the folder 246 is also cut-away at 263, Fig. 59, to permit proper feeding of the article to the folder.

The side flap 110 is pressed against the top of the package by top plate 261 and also by the packages pressing against one another when in the delivery trough. The pressure of the packages in the delivery trough gives the adhesive a chance to "set."

Discharge

Following complete wrapping of the article by the side flap folders 245 and 246 the conveyor chain 6 moves around the sprocket 3 at the right-hand end of the machine and feeds the wrapped articles to a discharge apparatus best shown in Figs. 61 to 65. Discharge takes place at a position approximately 90° around the sprocket 3, whereby the wrapped article is discharged while standing substantially vertically on one of its side edges. During movement to the discharge position the article is guided by the supporting rails 13 and 14 which curve around the sprocket 3 as shown in Figs. 61 and 63. Curved top plates 265 and 266, Figs. 61, 62 and 63 maintain the articles on the rails 13 and 14 until the discharge position is reached. During movement of the articles around the upper curved portion of the guide rails, the pusher head 11 is maintained in constant engagement with the article by an upwardly inclined portion 267 of the cam track 21, Fig. 61.

The articles are discharged by means of a pair of rotary discharge members 268 which are mounted upon vertically extending shafts 269 rotatably supported by a bracket 270 bolted to the main frame of the machine. The discharge members 268 and shafts 269 are rotated in synchronism by means of a shaft 271 which is rotatably supported by frame 1 and bracket 270' and carries a pair of spiral gears 272. The spiral gears 272 mesh with spiral gears 273 attached to the shafts 269, thereby to effect rotation of the shafts 269 and rotary members 268 upon rotation of the shaft 271.

Each of the rotary discharge members 268 is provided with a peripheral cut-away portion 274 comprising a spiral track 275 and a pusher face 276. The discharge members 268 are rotated in the direction indicated by the arrows in Figs. 64 and 65. The wrapped article 25 is first received by the cut-away portion 274 as it is advanced downwardly by the pusher head 11. The timing of the parts is such that as the article travels downwardly into the cut-away portion 274, the leading or lower edge of the wrapped package is free of the track 275 by a small margin. A portion of the periphery of the discharge members 268 adjacent the track 275 is thereby provided to hold a previously ejected package clear of the discharge members to prevent it from falling back into the path of the oncoming package, until just prior to the time that the pusher face 276 contacts the oncoming package.

Just as the article reaches the lower ends of the discharge members 268 it is engaged by the pusher faces 276 of the members 268 and is caused to move forwardly on a bottom plate 280 of a discharge chute comprising the bottom plate 280 and upwardly extending side walls 281. The article is thus removed from the pusher head 11 as the pushers 9 continue to move downwardly around the sprocket 4 and cam groove 21. The discharge trough for receiving the articles is mounted upon a bracket 282 which extends outwardly from the main frame, and the articles are advanced along the trough or chute by the successive pushing operations of the rotary discharge members 268.

A means is also provided for discharging broken or like articles which are not properly discharged by the rotary member 268. This means comprises an arm 285 which is pivotally mounted on a block 286 by a pivot pin 287 and carries a plate 288 which extends beneath the bracket 282 and chute plate 280. The block 286 is mounted upon the bracket plate 282, and the plate member 288 is provided with a pair of upwardly extending arms 289 which extend upwardly through suitable cut-away portions in the chute bottom 280 and receive the article 25 as it is advanced downwardly by the pushers 9 and rotary discharge members 268.

The bottom 280 of the discharge chute terminates in advance of an article as it is fed downwardly by a pusher head 11, as shown in Figs. 64 and 65, and the article is therefore first received upon the arms 289. A spring 290 tensioned between a pin 291 mounted in the block 286 and a pin 292 mounted in the arm 285 normally urges the plate 288 and arms 289 upwardly so that the tops of the arms 289 normally lie in substantially the same plane as the top of the chute bottom 280. Should a broken or otherwise displaced article be received upon the tops of the arms 289 and not advanced forwardly by the discharge members 268, however, the arms 289 are adapted to move about the pivot 287 and permit the broken or displaced article to drop beneath the chute bottom 280 as a succeeding article is advanced by the conveyor chain. A guide 293, Fig. 61, causes the thus discharged articles to move away from the rotating parts of the discharge mechanism and these articles may be then received within a suitable receptacle, not shown.

Drive

The entire apparatus is driven from a common power source, such as a motor 300, Fig. 1, the various operating parts being so coordinated as to operate in proper timed relationship. The motor 300 drives a pulley 301 which is connected with a pulley 302 by a belt 303. The pulley 302 is mounted on a main drive shaft 304 which has a gear 305 attached thereto. The gear 305 meshes with a gear 306 loosely mounted on a shaft 307. The gear 306 meshes with a gear 308 loosely mounted on the shaft 158 of the drive mechanism for the reversing wheel.

The gear 308 meshes with an idler gear 309 which in turn meshes with a gear 310. The gear 310 carries a pinion 311 which meshes with a gear 312 mounted on the shaft 94 of the rollers 81. The shaft 94 carries a pinion 313 which meshes with a pinion 314. The pinion 314 meshes with an idler gear 315 which meshes with a pinion 316 meshing with the gear 317 mounted on the shaft 56 of the wrapper feed roll 39. The pinion 311 also engages the gear 68 which drives the gear 67 for rotating the rotary cutter 42 at a variable speed.

The gear 305 on the main drive shaft 304 also meshes with a gear 320 rotatably mounted on a shaft 321, Fig. 11. The gear 320 provides for rotating the reversing wheel 115 and, as above described, this wheel is driven at a variable speed. For this purpose the gear 320 carries a channel member 322 within which a roller 323 mounted on a gear 324 is received. The gear 324 is mounted upon a shaft 325 which is eccentrically positioned with respect to the shaft 321 and is carried by a bracket 326, Figs. 3, 4 and 11.

The gear 324 meshes with a gear 327 which rotates a pinion 328 meshing with a gear 329 attached to the shaft 158 of the reversing wheel. The gear 308 also meshes with an idler gear 330 which meshes with a gear 331. The gear 331 meshes with a gear 332 which is mounted on a shaft 333, Figs. 4 and 53. The shaft 333 carries a bevel gear 334 which meshes with a bevel gear 335 mounted on the shaft 195 which drives the rotary folders 173 and 176.

The shaft 333 also provides for driving the shaft 224 carrying the side flap tucking fingers 205. A loose driving coupling is provided between the shafts 333 and 224 to permit the above described pivotal movement of the tuckers 205 and creaser 210 about the pivot pin 217. This coupling comprises a pin, Fig. 53, carried by a collar attached to the shaft 224 and a cooperating driving pin 337 carried by a flanged collar 338 attached to the shaft 333.

The gear 332 also meshes with a gear 339 mounted on the shaft 247. The shaft 247 also carries a pinion 340 which meshes with a gear 341 rotatably mounted on a shaft 342 beneath the shaft 247. A pinion 343 is attached to the gear 341 and engages a gear 344 which is attached to the shaft 5 of the right-hand sprocket wheel 3 and provides for driving the rotary conveyor chain 6. The gear 344 also meshes with a gear 345 mounted on the shaft 271 which drives the rotary discharge members 268.

*Operation*

The conveyor chain 6 is continuously moved by the sprocket 3, thereby to continuously advance the pushers 9 and pusher heads 11. The articles are advanced to the guide rails 13 and 14 along which the pusher heads 11 travel by means of the feeding chute 26. Alternatively the articles may be fed along a horizontally arranged chute 350, Fig. 5, the cam track 21 being provided with a portion 351 providing for proper feeding engagement of the pusher heads 11 with an article to be fed.

The pushers 9 feed the articles into wrappers 37 which are partially folded about the leading edge of the article. Thereafter the partially wrapped articles are passed along stationary end flap tuckers 75 and the tucked end flaps are rolled down by the rolls 81 and 82. The tucked end flaps are then folded downwardly by the stationary end folders 105 and blades 107.

The partially wrapped article is next inverted by the reversing wheel comprising the spider members 115. Following inversion the articles are again picked up by the conveyor 6 and are moved past the rotary end flap folders 173 and 176 which fold the end flaps downwardly against the body of the article and wrapper. The forwardly extending side flap 110 is next tucked by the tucking fingers 205 to cause the forwardly extending end flaps 78 to be rolled inwardly. A side flap creaser 210 then operates to crease the inwardly rolled forwardly extending side flaps 78, thereby to provide tapering side edges on the flap portion 110.

The forwardly extending side flap portions 110 of the wrapper are next engaged by bars 245 which cause the flap 110 to be folded upwardly about the leading edge of the article. The spring pressed member 258 of the folder 246 then engages the up-raised flap portions 110 and folds the same downwardly against the article. Thereafter the article is moved to discharge position in which the rotary discharge members 268 provide for discharging the article from the conveyor 6 and moving the article into a discharge chute. In the event that an article is not properly advanced by the discharge members 268 the pivotally mounted arms 289 provide for discharging the article downwardly below the discharge chute.

The conveyor and transfer mechanism, the article conveying mechanism, and the article conveying and discharging mechanism, are claimed in co-pending divisional applications, Serial Nos. 553,448, 553,449, and 553,450, respectively, each filed September 9, 1944.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A wrapping machine comprising means for feeding a wrapper to a predetermined position, means for feeding an article through the wrapper to effect a partial fold of the wrapper by engagement thereof with the article, means to hold the partially wrapped article in a predetermined position, means to tuck the edges of the wrapper about the article at the sides thereof, a continuously moving transfer wheel, means to feed articles with the partially folded and tucked wrapper thereabout successively to the wheel, on one side thereof, and means to discharge the partially folded and partially tucked articles in inverted position from said wheel on the other side thereof.

2. A wrapping machine comprising a rotary folder of generally circular contour and of a predetermined thickness, said folder being recessed on both sides thereof to provide a reduced section, said section having a slot therein, elongated arms mounted on the outer surfaces of the reduced section, an integral extension connecting the arms and receivable in the slot, means pivotally mounting said arms on said reduced section, said slot being wider than the extension to permit limited pivotal movement of the arms, and spring means carried by the folder to urge the arms to a predetermined position.

3. A wrapping machine comprising means for feeding a wrapper to a predetermined position, means for feeding an article through the wrapper to effect a partial fold of the wrapper by engagement thereof with the article, means to hold the partially wrapped article in a predetermined position, means to tuck the edges of the wrapper about the article at sides thereof, a continuously moving transfer wheel adapted to receive the article with the partially folded and tucked wrapper thereabout and to reverse the position of the article, continuously operable means for feeding partially wrapped articles into the said wheel, means for driving said wheel in coordination with the feed of partially wrapped articles thereinto, and means to discharge the partially folded and partially tucked articles in inverted position from said wheel.

4. A wrapping machine comprising means for feeding a wrapper to a wrapping station, article transfer means for delivering an article edgewise through the wrapping station to effect a partial fold of the wrapper about the forward edge of the article, tucking means to partially tuck and fold the side edges of the wrapper, a continuously moving transfer wheel, and folding means for folding down the partially tucked side edges, said transfer means serving to deliver said articles, with the partially folded and tucked wrapper thereon, successively, from the wrapping station through said tucking means to said transfer wheel, on one side thereof, said transfer means also serving to receive the articles, with partially folded and tucked wrapper thereon, from said wheel, in inverted position, and to deliver the articles to and through said folding means.

5. A wrapping machine comprising means for feeding a wrapper to a wrapping station, article transfer means for delivering an article edgewise through the wrapping station to effect a partial fold of the wrapper about the forward edge of the article, tucking means to partially tuck and fold the side edges of the wrapper, a continuously moving transfer wheel, and folding means for folding down the partially tucked side edges, said transfer means serving to deliver said articles, with the partially folded and tucked wrapper thereon, successively, from the wrapping station through said tucking means to said transfer wheel, on one side thereof, said transfer means also serving to receive the articles, with partially folded and tucked wrapper thereon, from said wheel, in inverted position, and to deliver the articles to and through said folding means, said folding means comprising means to iron the partially tucked wrapper edges to stretch the wrapper tightly upon the article, and means to fold the ironed edges down upon the body of the wrapped article.

6. A wrapping machine comprising means for feeding a wrapper to a wrapping station, article transfer means for delivering an article edgewise through the wrapping station to effect a partial fold of the wrapper about the forward edge of the article, a foldable edge of the wrapper projecting behind the trailing edge of the article, means to partially fold the side edges of the wrapper, a continuously moving transfer wheel, and folding means, said transfer means serving to deliver said articles, with the partially folded wrapper thereon, successively, from the wrapping station through said folding means to said transfer wheel, on one side thereof, said transfer means also serving to receive the articles, with wrapper thereon, from said wheel, in inverted position, with said foldable wrapper edge projecting forwardly of the article, and to deliver the articles to and through said folding means.

7. A wrapping machine comprising means for feeding a wrapper to a wrapping station, article transfer means for delivering an article edgewise through the wrapping station to effect a partial fold of the wrapper about the forward edge of the article, a foldable edge of the wrapper projecting behind the trailing edge of the article, means to partially fold the side edges of the wrapper, a continuously moving transfer wheel, and folding means, said transfer means serving to deliver said articles, with the partially folded wrapper thereon, successively, from the wrapping station through said folding means to said transfer wheel, on one side thereof, said transfer means also serving to receive the articles, with wrapper thereon, from said wheel in inverted position, with said foldable wrapper edge projecting forwardly of the article, and to deliver the articles to and through said folding means, said folding means comprising successively operable means to fold down said side edges and said foldable edge upon the body of the wrapped article.

CLARENCE J. MALHIOT.

REFERENCES CITED

The following references are of record in the file of this patent:

UNITED STATES PATENTS

| Number | Name | Date |
|---|---|---|
| 1,965,324 | Tindal et al. | July 3, 1934 |
| 2,144,265 | Milmoe | Jan. 17, 1939 |
| 2,155,398 | Bronander | Apr. 25, 1939 |
| 2,192,683 | Bronander | Mar. 5, 1940 |
| 2,246,268 | Smith | June 17, 1941 |
| 2,175,177 | Butler | Oct. 10, 1939 |
| 2,281,006 | Nicodemus | Apr. 28, 1942 |
| 1,971,875 | Pent | Aug. 28, 1934 |
| 1,987,871 | Rose | Jan. 15, 1935 |
| 1,559,618 | Kappes et al. | Nov. 3, 1925 |
| 1,961,697 | Little | June 5, 1934 |
| 1,818,497 | Milmoe | Aug. 11, 1931 |
| 2,276,744 | Smith et al. | Mar. 17, 1942 |

FOREIGN PATENTS

| Number | Country | Date |
|---|---|---|
| 435,095 | Great Britain | Sept. 13, 1935 |